United States Patent
Rudraraju et al.

(10) Patent No.: US 11,762,656 B2
(45) Date of Patent: Sep. 19, 2023

(54) SERVICE FABRICATION TOOL

(71) Applicant: salesforce.com, inc., San Francisco, CA (US)

(72) Inventors: Prakash Rudraraju, San Francisco, CA (US); Maheswara Sunil Varma Sayyaparaju, San Francisco, CA (US); Damini Satya, San Francisco, CA (US); Babu Satasiya, San Francisco, CA (US)

(73) Assignee: SALESFORCE, INC., San Francisco, CA (US)

( * ) Notice: Subject to any disclaimer, the term of this patent is extended or adjusted under 35 U.S.C. 154(b) by 238 days.

(21) Appl. No.: 17/002,616

(22) Filed: Aug. 25, 2020

(65) Prior Publication Data
US 2022/0012045 A1    Jan. 13, 2022

(51) Int. Cl.
| | | |
|---|---|---|
| G06F 8/71 | (2018.01) | |
| G06Q 30/02 | (2023.01) | |
| G06F 16/951 | (2019.01) | |
| G06F 8/36 | (2018.01) | |

(52) U.S. Cl.
CPC ............... *G06F 8/71* (2013.01); *G06F 8/36* (2013.01); *G06F 16/951* (2019.01); *G06Q 30/02* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

OTHER PUBLICATIONS

Burns et al., "Design patterns for container-based distributed systems", 8th (USENIX) Workshop on Hot Topics in Cloud Computing (HotCloud 16)(2016).

(Continued)

*Primary Examiner* — Chat C Do
*Assistant Examiner* — William C Wood
(74) *Attorney, Agent, or Firm* — Schwabe Williamson & Wyatt

(57) ABSTRACT

Disclosed embodiments include a Custom Resource Abstraction and Fabrication Tool (CRAFT) that declares operators in a robust, idempotent, and generic manner for any resource. In embodiments, a developer can run create, read, update, and delete (CRUD) operations on resources in any language. The developer can create configuration files that is used by CRAFT to generate and deploy application container with the operator according to the configuration files. Other embodiments may be described and/or claimed.

19 Claims, 6 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0010586 A1* | 1/2004 | Burton ............... H04L 41/0893 709/224 |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | | |
|---|---|---|---|
| 2009/0177744 | A1 | 7/2009 | Marlow et al. |
| 2011/0218958 | A1 | 9/2011 | Warshaysky |
| 2011/0247051 | A1 | 10/2011 | Bulumulla |
| 2012/0042218 | A1 | 2/2012 | Cinarkaya |
| 2012/0233137 | A1 | 9/2012 | Jakobson et al. |
| 2012/0290407 | A1 | 11/2012 | Hubbard et al. |
| 2013/0212497 | A1 | 8/2013 | Zelenko et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0247216 | A1 | 9/2013 | Cinarkaya |
| 2014/0354442 | A1* | 12/2014 | Maity ............... G08B 27/005 340/691.6 |
| 2014/0359537 | A1 | 12/2014 | Jackobson et al. |
| 2017/0249177 | A1* | 8/2017 | Liggitt ............... G06F 9/45558 |
| 2019/0265982 | A1* | 8/2019 | Mickelsson ......... H04L 41/0813 |
| 2020/0310789 | A1* | 10/2020 | Zhou ..................... G06F 8/71 |
| 2021/0200814 | A1* | 7/2021 | Tal ..................... G06F 16/178 |
| 2021/0342174 | A1* | 11/2021 | Bursell ............... G06F 11/0772 |

OTHER PUBLICATIONS

Ibryam et al., "Kubernetes Patterns: Reusable Elements for Designing Cloud-Native Applications", O'Reilly Media Inc. (May 2019).

Goasguen et al., "Kubernetes Cookbook: Building Cloud-Native Applications", excerpts from chapters 10 and 12 of Kubernetes, O'Reilly Media Inc. (Mar. 2018).

Ruzicka, "Kubernetes Tasks Documentation", Kubernetes.io Release 0.1 (Jan. 13, 2020).

Kubernetes Documentation (May 2020), available at <https://kubernetes.io/docs/home/>.

* cited by examiner

SERVICE FABRICATION TOOL

RELATED APPLICATIONS

The present application claims priority to Indian Patent Application No. 202041029611 filed on Jul. 13, 2020, the contents of which are hereby incorporated by reference in their entirety.

TECHNICAL FIELD

The present invention relates generally to computing systems virtualization and containerization, and more particularly to deploying and managing application services in a cloud environment.

BACKGROUND

Application services, such as customer relationship management (CRM) applications, are frequently built from individual components, such as databases, existing software components, declarations of virtual processors, load-balancers, and the like. These services, for example, may be configured based on generic individual components using tools provided by Amazon Web Service (AWS), Kubernetes, or the like.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
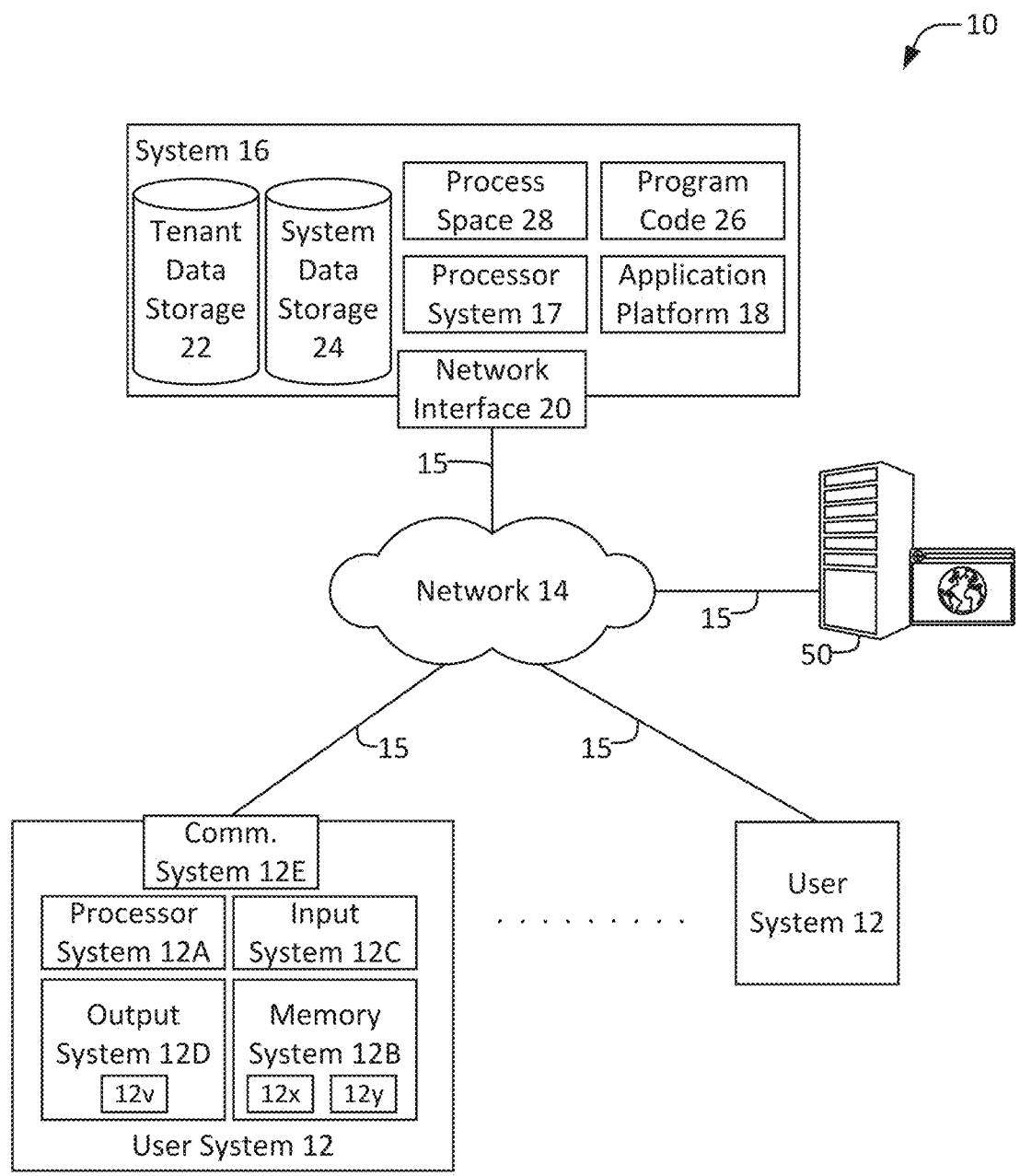
FIG. 1A shows an example environment in which an on-demand database service can be used according to some implementations.

The following detailed description discusses an architecture to enable developers to build and manage an application service in a cloud-based environment using custom resources without having to do extensive coding to create a custom resource operator. This architecture may be referred to as a Custom Resource Abstraction and Fabrication Tool (CRAFT) architecture. In embodiments, CRAFT provides high-level configurations and abstractions to implement requirements (e.g., business entity requirements) within the various components that make up the application service.

In embodiments, the various components may be implemented as custom resources, which may include, for example, databases, search components, authentication components as well as other applications. The high-level configurations and abstractions are used to create custom resource operators that are used to customize the configuration and operation of a custom resource so that it conforms to application requirements, business logic, and/or operational rules of the organization, with very little software coding required. One example of this in the Kubernetes deployment and operation environment is a Kubernetes operator for a customer resource. Although Kubernetes is used in various examples throughout the present disclosure, it should be appreciated that the disclosed embodiments may be used in any deployment system.

In legacy implementations, custom resource operators required extensive coding work. They typically use multiple developers working many days to write or update interfaces between components or to introduce business logic functionality within the components. As a result, development teams were often needed to build multiple custom operators in order to introduce an application service. This frequently resulted in many errors due to the low-level modifications needed to construct the custom operators.

In embodiments described herein, a single developer can configure, deploy, and manage multiple application services by specifying custom requests in one or more high-level configuration files. Furthermore, during deployment, specifically during compile time, build time, and/or runtime operation of the custom resources of the application, the developer may receive high-level feedback and/or instructions that can be used to quickly identify problems and improve operation of the application service.

The service fabrication (e.g., CRAFT) architecture includes two independent aspects: (1) custom requests that define at a high level of abstraction how the various components are to be configured and integrated for the customer domain during the service building and validation, and (2) curated feedback to provide high-level information and simplified instructions to the developer during the compilation, build, and runtime of the service.

CRAFT declares operators in a robust and generic way for any resource, letting developers focus on CRUD operations of resource management in an idempotent way, in a language of their choice. In embodiments, CRAFT offers support for all languages, and therefore, the CRUD operations of the operator can be written in any language. The embodiments herein also provide automated and/or controlled reconciliation for any resource to create native abstractions. Here, "reconciliation" may refer to processes or procedures for verifying data, and may take place during application/service deployment and/or during data migration. Reconciliation may involve comparing target data with source data to ensure that the deployment or migration architecture is operating as intended. In some embodiments, structural schema validation for a Custom Resource Definition (CRD) happens within CRAFT while creating an operator. In some embodiments, CRAFT may provide automated data validation and reconciliation (DVR), which involves using mathematical models to automatically recalibrate or correct the resource(s) and/or structural schema(s).

The following is a brief overview of selected features of various embodiments. This overview is not an extensive summary of the invention or claimed embodiments, is not intended to identify particularly significant aspects of disclosed embodiments, and does not delineate any particular scope of the invention. This overview merely presents some concepts that may facilitate, in a condensed and simplified format, understanding more detailed description below and appreciate the breadth of the claimed embodiments.

It will be appreciated while various alternatives are disclosed, they are approaches that may be pursued, but none are approaches that necessarily must be used. In addition, while issues with solutions may be identified with respect to one or more exemplary approaches described herein, none should be assumed to have been recognized in any prior art on the basis of being identified as a known issue. In this description, for the purposes of explanation, numerous specific details are set forth in order to provide a thorough understanding of the present invention. It will be apparent, however, the present invention may be practiced without these specific details. In other instances, well-known structures and devices are not described in exhaustive detail, in order to avoid unnecessarily occluding, obscuring, or obfuscating the present invention.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

The present disclosure discusses, among other things, a cloud-based system with many different entities, e.g., servers, clients, databases, firewalls, other machines, etc. At any given moment there may be many different computing devices, e.g., portable computers (laptops, tables, phones, any small and/or portable form factor device, etc.), server computers, client computers, etc. The phrase "client computers" may refer to the same kinds of devices, machines, software, etc. as meant when using the phrase "server computers." With respect to client/server engagements, the term "client" represents a matter of perspective; if a first organization is using the services of a second organization, the first organization may be considered the "client" of the second organization, and the second organization considered the "server" of the services, even if the first organization itself is a server providing services to another organization.

Example embodiments of the present disclosure may be described in terms of a multitenant and/or cloud computing architecture or platform. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Multi-tenancy is a feature of cloud computing where physical or virtual resources are allocated in such a way that multiple tenants and their computations and data are isolated from and inaccessible to one another. As used herein, the term "tenant" refers to a group of users (e.g., cloud service users) who share common access with specific privileges to a software instance and/or a set of computing resources. Tenants may be individuals, organizations, or enterprises that are customers or users of a cloud computing service or platform. However, a given cloud service customer organization could have many different tenancies with a single cloud service provider representing different groups within the organization. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

I. Example System Overview

FIG. 1A shows an example of an environment 10 in which on-demand services (e.g., cloud computing services and/or database services) can be used in accordance with various embodiments. The environment 10 includes user systems 12, a network 14, system 16 (also referred to herein as a "cloud-based system," "database system," "cloud computing service," or the like), and one or more customer platforms (CPs) 50. The cloud system 16 includes a processor system 17, an application platform 18, a network interface 20, tenant database (DB) 22 for storing tenant data 23 (see e.g., FIG. 1B), system DB 24 for storing system data 25 (see FIG. 1B), program code 26 for implementing various functions of the system 16, and process space 28 for executing DB system processes and tenant-specific processes, such as running applications as part of an application hosting service. In some other implementations, environment 10 may not have all of these components or systems, or may have other components or systems instead of, or in addition to, those listed above.

Figure 1B:
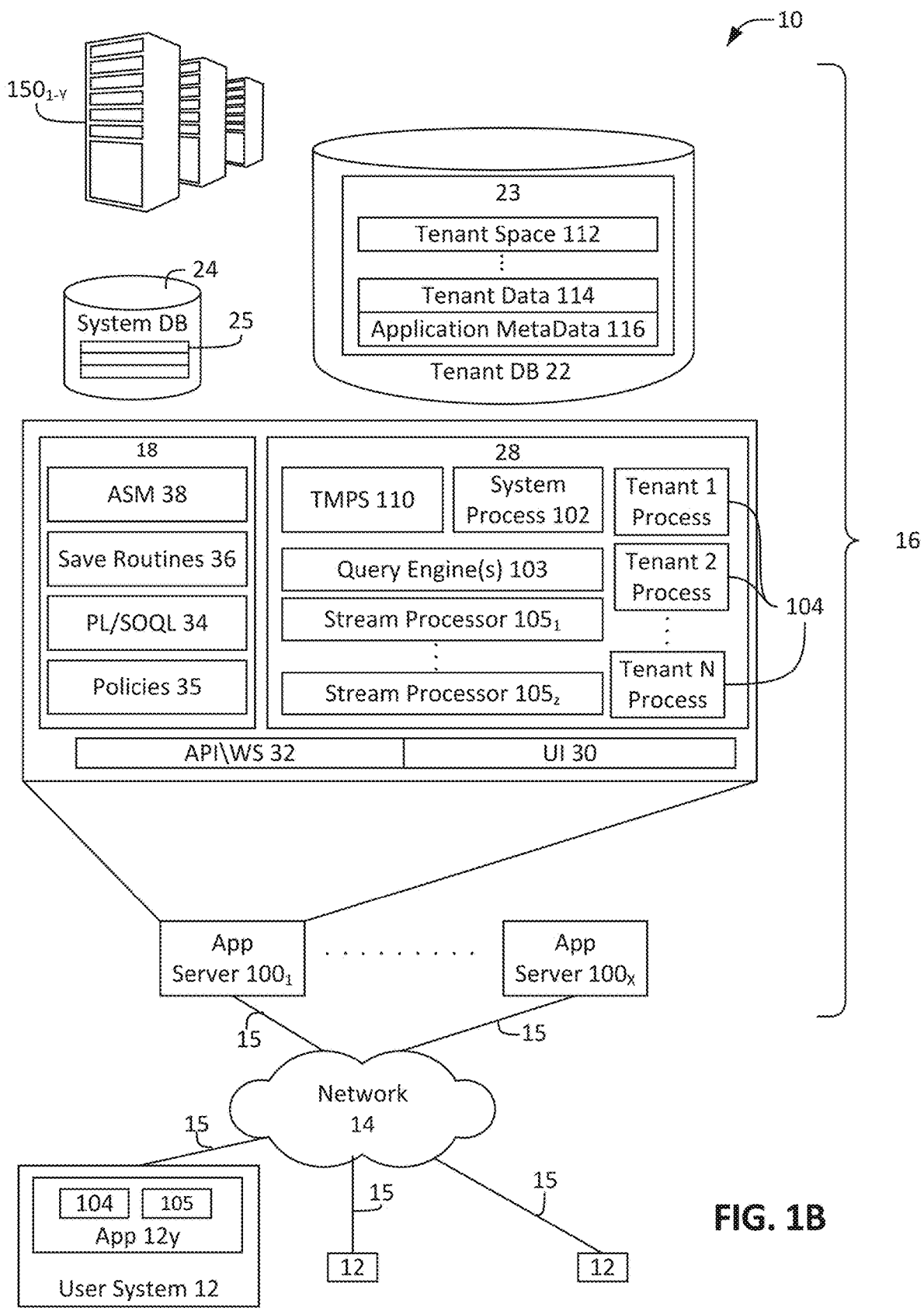
FIG. 1B shows an example implementations of elements of FIG. 1A and example interconnections between these elements according to some implementations.

The system 16 may be a DB system and/or a cloud computing service comprising a network or other interconnection of computing systems (e.g., servers, storage devices, applications, etc., such as those discussed with regard to FIGS. 1A-1B) that provides access to a pool of physical and/or virtual resources. In some implementations, the system 16 is a multi-tenant DB system and/or a multi-tenant cloud computing platform. In some implementations, the system 16 provides a Communications as a Service (CaaS), Compute as a Service (CompaaS), Database as a Service (DaaS), Data Storage as a Service (DSaaS), Firewall as a Service (FaaS), Infrastructure as a Service (IaaS), Network as a Service (NaaS), Platform as a Service (PaaS), Security as a Service, Software as a Service (SaaS), and/or other like cloud services.

In some implementations, the environment 10 is an environment in which an on-demand DB service exists. An on-demand DB service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand DB services can store information from one or more tenants into tables of a common DB image to form a multi-tenant DB system (MTS). The term "multi-tenant DB system" can refer to those systems in which various elements of hardware and software of a DB system may be shared by one or more customers or tenants. For example, a given application server may simultaneously process requests for a great number of customers, and a given DB table may store rows of data such as feed items for a potentially much greater number of customers. A DB image can include one or more DB objects. A relational DB management system (RDBMS) or the equivalent can execute storage and retrieval of information against the DB object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand DB service, users accessing the on-demand DB service via user systems 12, or third party application developers accessing the on-demand DB service via user systems 12.

In some embodiments, the system 16 implements a web-based customer relationship management (CRM) system. For example, in some such implementations, the system 16 includes application servers configurable or operable to implement and execute CRM software applications as well as provide related data, code, forms, renderable web pages and documents and other information to and from user systems 12 and to store to, and retrieve from, a DB system related data, objects, and web page content. In some MTS implementations, data for multiple tenants may be stored in the same physical DB object in tenant DB 22. In some such implementations, tenant data is arranged in the storage medium(s) of tenant DB 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more DB objects and the execution of the applications in one or more virtual machines in the process space of the system 16. The applications of the application platform 18 may be developed with any suitable programming languages and/or development tools, such as those discussed herein. The applications may be built using a platform-specific and/or proprietary development tool and/or programming languages, such as those discussed herein.

The tenant data storage 22, the system data storage 24, and/or some other data store (not shown) include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

According to some implementations, each system 16 is configured, configurable, or operable to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or DB, and, in some instances, a DB application (e.g., OODBMS or RDBMS) as is well known in the art. It should also be understood that "server system" and "server" are often used interchangeably herein. Similarly, the DB objects (DBOs) described herein can be implemented as part of a single DB, a distributed DB, a collection of distributed DBs, a DB with redundant online or offline backups or other redundancies, etc., and can include a distributed DB or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols such as those discussed herein. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Internet Protocol (IP), Internet Protocol Security (IPsec), Session Initiation Protocol (SIP) with Real-Time Transport Protocol (RTP or Secure RTP (SRTP), Internet Control Message Protocol (ICMP), User Datagram Protocol (UDP), QUIC (sometimes referred to as "Quick UDP Internet Connections"), Stream Control Transmission Protocol (SCTP), Web-based secure shell (SSH), Extensible Messaging and Presence Protocol (XMPP), WebSocket protocol, Internet Group Management Protocol (IGMP), Internet Control Message Protocol (ICMP), etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents (e.g., HTML, XML, JSON, Apex®, CSS, JSP, MessagePack™, Apache® Thrift™, ASN.1, Google® Protocol Buffers (protobuf), DBOs, or some other like object(s)/document(s)). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), a Head-Up Display (HUD) device/system, a an Extended Reality (XR) device (e.g., Virtual Reality (VR), Augmented Reality (AR), and/or Mixed Reality (MR) device), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As shown by FIG. 1A, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application(s) 12y and/or other applications discussed herein) for carrying out the procedures, processes, methods, etc. of the embodiments discussed herein, as well as an operating system (OS) 12x and one or more DBs or DBOs (not shown).

The application(s) 12y (also referred to as "app 12y" or "apps 12y") is/are a software application designed to run on the user system 12 and is used to access data stored by the system 16. The apps 12y may be platform-specific, such as when the user system 12 is implemented in a mobile device, such as a smartphone, tablet computer, and the like. The apps 12y may be a native application, a web application, or a hybrid application (or variants thereof). One such app 12y may be the previously discussed HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (e.g., a subscriber of on-demand services provided by the system 16) of the user system 12 to access, process and view information, pages, interfaces (e.g., UI 30 in FIG. 1B), and application(s) 12y available to it from the system 16 over the network 14. In other implementations, each user system 12 may operate a web or user app 12y designed to interact with applications of the application platform 18 allowing a user (e.g., a subscriber of on-demand services provided by the system 16) of the user system 12 to access, process and view information, pages, interfaces (e.g., UI 30 in FIG. 1B), and apps 12y available to it from the system 16 over the network 14. In some cases, an owner/operator of system 16 may have pre-built the web or user apps 12y for use by clients, customers, and/or agents of a tenant organization (org) to access a tenant space or enterprise social network of that tenant org. In some cases, developers associated with a tenant org (e.g., CP 50) may build custom application(s) for interacting with the tenant data. The user (or third party) application(s) may be native application(s) (e.g., executed and rendered in a container) or hybrid application(s) (e.g., web applications being executed/rendered in a container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the system 16, and/or a platform of a third party system/platform. The web, user, or third party application(s) 12y discussed herein may be a software, program code, logic modules, application packages, etc. that are built using one or more programming languages and/or development tools, such as those discussed herein. Furthermore, such applications may utilize a suitable querying language to query and store information in an associated tenant space, such as, for example, the various query languages discussed herein or the like. The apps 12y may be developed using any suitable programming language and/or development tools such as any of those discussed herein. In some implementations, the apps 12y may be developed using platform-specific development tools and/or programming languages such as those discussed herein.

In an example, the user systems 12 may implement web, user, or third party apps 12y to request and obtain data from system 16, and render graphical user interfaces (GUIs) in an application container or browser. These GUIs may correspond with GUI 12v and/or UI 30 shown and described with respect to FIG. 1B. In some implementations, the GUIs may include a data analytics GUI, such as Salesforce® Wave™ dashboard, Tableau® Desktop®, and the like, which may provide visual representations of data (also referred to as visual representations 12v or the like) residing in an enterprise cloud or in an on-demand services environment (e.g., a tenant space within system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of DB 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the system 16 so that the system 16 may authenticate the identity of a user of the user system 12.

In some embodiments, the user system 12 may include Trusted Compute resources that preserve data confidentiality, execution integrity and enforces data access policies. The Trusted Compute resources may be used to store cryptographic keys, digital certificates, credentials, and/or other sensitive information, and could be used to operate some aspects of an app 12y. The Trusted Compute resources can be implemented using software-based cryptographic security guarantees (e.g., Zero-Knowledge Proofs), virtualization using user-level or OS-level isolation (e.g., "containerization") or virtualization (e.g., using VMs), Trusted Multi-Party-Compute (MPC) resources, or using a Trusted Execution Environment (TEE). In either embodiment, an app 12y is capable of interfacing with the Trusted Compute resources using a suitable API 32 (see e.g., FIG. 1B). Where the Trusted Compute resources is/are implemented using secure enclaves, the app 12y can also interface directly with the enclave of a secure application or other like entity, and/or interface with other enclaves.

A TEE is a hardware-based technology that executes only validated tasks, produces attested results, provides protection from malicious host software, and ensures confidentiality of shared encrypted data. The TEE operates as a protected area accessible to the processor system 12A to enable secure access to data and secure execution of instructions. In some implementations, the TEE may be a physical hardware device that is separate from other components of the user system 12 such as a secure-embedded controller, a dedicated SoC, or a tamper-resistant chipset or microcontroller with embedded processing devices and memory devices (sometimes referred to as a hardware security module (HSM) or a trusted platform module (TPM)). Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. In other implementations, the TEE may be realized using secure enclaves, which are isolated regions of code and/or data within the processor and/or memory/storage circuitry of the user system 12. Only code executed within a secure enclave may access data within the same secure enclave, and the secure enclave may only be accessible using the secure application (which may be implemented by an application processor or a tamper-resistant microcontroller). Various implementations of the TEE, and an accompanying secure area in the processor system 12A or the memory system 12B may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the user system 12 through the TEE and the processor system 12A.

Each user system 12 typically includes an operating system (OS) 12x to manage computer hardware and software resources, and provide common services for various apps 12y. The OS 12x includes one or more drivers and/or APIs that provide an interface to hardware devices thereby enabling the OS 12x and applications to access hardware functions. The OS 12x includes middleware that connects two or more separate applications or connects apps 12y with underlying hardware components beyond those available from the drivers/APIs of the OS 12x. The OS 12x may be a general purpose OS or a platform-specific OS specifically written for and tailored to the user system 12.

The input system 12C can include any suitable combination of input devices, such as touchscreen interfaces, touchpad interfaces, keyboards, mice, trackballs, scanners, cameras, a pen or stylus or the like, or interfaces to networks. The input devices of input system 12C may be used for interacting with a GUI provided by the browser/application container on a display of output system 12D (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. The output system 12D can include any suitable combination of output devices, such as one or more display devices, printers, or interfaces to networks. The output system 12D is used to display visual representations and/or GUIs 12v based on various user interactions. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the system 16, the user system 12 using the communications system 12E may establish link 15 with network interface 20 of the system 16.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and DB information accessible by a lower permission level user, but may not have access to certain applications, DB information, and data accessible by a user at a higher permission level. Thus, different users generally will have different capabilities with regard to accessing and modifying application and DB information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (e.g., processor system 12B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centrig™ processor(s) from Qualcomm® Technologies, Inc.; Power Architecture processor(s) provided by the OpenPOWER® Foundation and/or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

The CP 50 includes one or more physical and/or virtualized systems for providing content and/or functionality (i.e., services) to one or more clients (e.g., user system 12) over a network (e.g., network 14). The physical and/or virtualized systems include one or more logically or physically connected servers and/or data storage devices distributed locally or across one or more geographic locations. Generally, the CP 50 is configurable or operable to use IP/network resources to provide web pages, forms, applications, data, services, and/or media content to different user system 12. As examples, the CP 50 may provide search engine services; social networking and/or microblogging services; content (media) streaming services; e-commerce services; blockchain services; communication services such as Voice-over-Internet Protocol (VoIP) sessions, text messaging, group communication sessions, and the like; immersive gaming experiences; and/or other like services. The user systems 12 that utilize services provided by CP 50 may be referred to as "subscribers" of CP 50 or the like. Although FIG. 1A shows only a single CP 50, the CP 50 may represent multiple individual CPs 50, each of which may have their own subscribing user systems 12.

CP 50 (also referred to as a "service provider platform", "tenant", "tenant organization", "enterprise platform," "enterprise," and/or the like) may be a customer or tenant of the system 16 that develops applications that interact and/or integrate with the system 16 and utilize data from an associated tenant space in tenant DB 22; these applications may be referred to as "customer apps," "CP apps," or the like. The term "customer platform" or "CP" as used herein may refer to both the platform and/or applications themselves, as well as the owners, operators, and/or developers associated with the customer platform. The CP apps may obtain data from the associated tenant space 112 (see e.g., FIG. 1B) to render/display visual representations of relevant tenant data 114 (see e.g., FIG. 1B). In some cases, the CP apps utilize tenant data 114 for interacting with user systems 12 (e.g., subscribers of the CP 50) via the system 16. To do so, the CP apps include program code or script(s) that call APIs/WS 32 (see e.g., FIG. 1B) to access tenant data 114 and/or otherwise interact with the tenant space 112.

FIG. 1B shows example implementations of elements of FIG. 1A and example interconnections between these elements according to some implementations. That is, FIG. 1B also illustrates environment 10, but FIG. 1B shows various elements of the system 16 and various interconnections between such elements are shown with more specificity according to some more specific implementations. In other implementations, the environment 10 may not have the same elements as those shown by FIG. 1B or may have other elements instead of, or in addition to, those listed.

In FIG. 1B, the network interface 20 and/or processor system 17 is/are implemented as a set of application servers $100_1$-$100_X$ (where X is a number). Each application server 100 (also referred to herein as an "app server", an "API server", an "HTTP application server," a "worker node", and/or the like) is configurable or operable to communicate with tenant DB 22 and the tenant data 23 therein, as well as system DB 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space (TMPS) 110. In various embodiments, the process space 28 includes one or more query processors 103 and one or more stream processors $105_1$ to $105_z$ (where z is a number). In some implementations, the stream processor(s) 105 is/are systems and/or applications that send or receive data streams and execute the applications or analytics logic in response to detecting events or triggers in/from the data streams. The stream processor(s) 105 process data directly as it is produced or received and detect conditions from the data streams within a relatively small time period (e.g., measured in terms of milliseconds to minutes). The stream processor(s) 105 may be implemented as software components (e.g., software engines, software agents, artificial intelligence (AI) agents, modules, objects, or other like logical units), as individual hardware elements, or a combination thereof. In an example software-based implementation, the stream processor(s) 105 may be developed using a suitable programming language, development tools/environments, etc., which are executed by one or more processors of one or more computing systems (see e.g., processor system 17 of FIG. 1A). In this example, program code of the stream processor(s) 105 may be executed by a single processor or by multiple processing devices. In an example hardware-based implementation, the stream processor(s) are implemented by respective hardware elements, such as GPUs (or floating point units within one or more GPUs), hardware accelerators (e.g., FPGAs, ASICs, DSPs, SoCs, digital signal controllers (DSCs), etc.) that are configured with appropriate logic blocks, bit stream(s), etc. to perform their respective functions, AI accelerating co-processor(s), tensor processing units (TPUs), and/or the like. In some embodiments, the stream processor(s) may be implemented using stream processor(s), which are systems and/or applications that send or receive data streams and execute the applications or analytics logic in response to detecting events or triggers from the data streams. The stream processor(s) process data directly as it is produced or received and detect conditions from the data streams within a relatively small time period (e.g., measured in terms of milliseconds to minutes). The stream processor(s) may be implemented using any stream/event processing engines or stream analytics engines such as, for example, Apache® Kafka®, Apache® Storm®, Apache® Flink®, Apache® Apex®, Apache® Spark®, IBM® Spade, Nvidia® CUDA™, Intel® Ct™, Ampa™ provided by Software AGO, StreamC™ from Stream Processors, Inc., and/or the like. In some implementations, the stream processor(s) 105 may implement or operate virtual machines (VMs), containers, or other suitable runtime environment(s) in which user apps, web apps, and/or CP apps may be executed. In some implementations, the query processor(s) 103 may also be stream processor(s) that are the same or similar to stream processor(s) 105. In some embodiments, the stream processor(s) 105 may be used to orchestrate container spin-up and deployment, as well as generate operators based on one or more configuration files according to the embodiments discussed herein.

The application platform 18 includes an application setup mechanism (ASM) 38 that supports application developers' ("app developers") creation and management of applications. Such applications and others can be saved as metadata into tenant DB 22 by save routines (SRs) 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to Application Programming Interface (API) 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In some implementations, the application platform 18 also includes policies 35. The policies 35 comprise documents and/or data structures that define a set of rules that govern the behavior of the various subsystems of the app server 100. For example, one or more of the policies 35 may dictate how to handle network traffic for specific network addresses (or address ranges), protocols, services, applications, content types, etc., based on an organization's information security (infosec) policies, regulatory and/or auditing policies, access control lists (ACLs), and the like. Additionally, the policies 35 can specify (within various levels of granularity) particular users, and user groups, that are authorized to access particular resources or types of resources, based on the org's hierarchical structure, and security and regulatory requirements. The documents or data structures of the policies 35 may include a "description," which is a collection of software modules, program code, logic blocks, parameters, rules, conditions, etc., that may be used by the app server 100 to control the operation of the app server 100 and/or access to various services. Any suitable programming languages, markup languages, schema languages, etc., may be used to define individual policies 35 and instantiate instances of those policies 35. As examples, the policies 35 may be defined using XML, JSON, markdown, IFTTT ("If This Then That"), PADS markup language (PADS/ML), Nettle, Capirca™, and/or some other suitable data format, such as those discussed herein.

The application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., system 16) in a web browser or app container). In various embodiments, this dev-environment may be used to develop the various files and configurations discussed infra with respect to FIGS. 2-5.

As mentioned previously, CPs 50 may be customers or tenants of the system 16 that develop CP apps that interact and/or integrate with the system 16 and utilize data from an associated tenant space in tenant DB 22. These CP apps may operate on or in the application platform 18, and may be developed using the aforementioned dev-environment. For example, CP apps may include or provide commerce apps/services (e.g., storefront and/or shopping cart apps, point-of-sale (PoS) apps/services, Warehouse Management System (WMS) and/or Enterprise Resource Planning (ERP) apps/services, etc.), digital marketing and engagement apps/services, advertisement network services data analytics apps/services, blockchain apps/services, and/or the like.

To integrate with the system 16, the CP apps include program code or script(s) that call the APIs/WS 32 to create and activate orders. The CP apps may also include program code/scripts that call APIs/WS 32 to adjust the orders as discussed herein. The CP apps may also call the APIs/WS 32 to return aggregate statistics about various orders. In some embodiments, the CP apps 50 may be the client app 12y discussed previously, or a web app that is rendered and/or executed by the client app 12y (e.g., where the CP apps 50 are web apps and the client app 12y is a browser or other HTTP client that renders the web apps, executes client-side scripts, and/or the like). In other embodiments, the CP apps 50 may be server-side (e.g., CP 50 side) applications, that interact with the user-facing client app 12y.

The system 16 of FIG. 1B also includes a user interface (UI) 30 and one or more APIs 32 (also referred to as a "web service") to system 16 resident processes, which allow users or developers at user systems 12 to access the resident processes. The API(s) 32 is/are interface(s) for software components to communicate with each other. In some implementations, the API(s) 32 are source code specification(s) or a collection of libraries, routines, methods, data structures, fields, objects, classes, variables, remote calls, and the like that defines how a software element may access or interact with the underlying platform capabilities and features of the CP 50. Developers and programmers can use the API(s) 32 by importing the relevant classes and writing statements that instantiate the classes and call their methods, fields, etc. The application (app) code, app/service templates, and/or policies 35 developed by customer platforms may be pushed or otherwise sent to the system 16 using one or more APIs 32. In these implementations, the app code, app/service templates, and/or policies 35 may be developed using a development (dev) environment, programming language(s), and/or dev-tools provided by the system 16.

The API(s) 32 may be implemented as a remote API or a web API, such as a Representational State Transfer (REST or RESTful) API, Simple Object Access Protocol (SOAP) API, salesforce.com Apex API, and/or some other like API. The API 32 may be implemented as a web service including, for example, Apache® Axi2.4 or Axi3, Apache® CXF, a JSON-Remote Procedure Call (RPC) API (e.g., Ethereum JSON-RPC API implemented by a public or enterprise Ethereum® blockchain platform), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API(s) 32 may include one or more public APIs and one or more private APIs. The public APIs are APIs that includes one or more publically exposed endpoints that allows user systems 12 to access tenant data. These endpoints specify where resources are located and/or how particular web services can be accessed. The app(s) 12y (see e.g., FIG. 1A) may be used to generate and transmit a message (e.g., an HTTP message) with a user-issued query and a suitable URI/URL to access of an endpoint of the system 16. In embodiments, one or more of the APIs 32 may be an asynchronous ("async") query API, where the user-issued query includes an API call or other like instruction indicating that a user-issued query should be treated as an aysnc query (referred to as an "async query verb"). The async query verbs to invoke the async query API 32 may be defined and/or coded using PL/SOQL 34 or some other suitable programming or query language. When an async query invokes the async query API, an async query engine (e.g., a query engine 103) or async query scheduler may generate a corresponding async query job. The term "job" as used herein refers to a unit of work or execution that performs work that comprises one or more tasks. Individual jobs may have a corresponding job entity comprising a record or DB object that stores various values, statistics, metadata, etc. during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

Private APIs are APIs 32 that are private or internal to the system 16, which allows system applications (e.g., tenant management process 110, system process 102, query engine(s) 103, crypto processor(s) 105, and validation processor(s) 105 to access other system applications. The private APIs 32 may be similar to the public APIs 32 except that the endpoints of the private APIs 32 are not publically available or accessible. The private APIs 32 may be made less discoverable by restricting users, devices, and/or applications from calling or otherwise using the private APIs 32. For example, use of the private APIs 32 may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 is communicably coupled with tenant DB 22 and system DB 24, for example, having access to tenant data 23 and system data 25, respectively, via a different network connection 15. For example, one application server 1001 can be coupled via the network 14 (e.g., the Internet), another application server 100N can be coupled via a direct network link 15, and another application server 100N can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used. The application servers 100 may access the tenant data 23 and/or the system data 25 using suitable private APIs as discussed previously.

In some implementations, each application server 100 is configurable or operable to handle requests for any user associated with any organization that is a tenant of the system 16. In this regard, each application server 100 is configurable or operable to perform various DB functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least-connections algorithm to route user requests to the app servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be an organization (org) that employs a sales force where each salesperson uses system 16 to manage aspects of their sales. A user can maintain contact data, leads data, customer follow-up data, performance data, goals and progress data, etc., all applicable to that user's personal sales process (e.g., in tenant DB 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant DB 22 or system DB 24. The system 16 (e.g., an application server 100 in the system 16) can automatically generate one or more native queries (e.g., SQL statements or SQL queries or the like) designed to access the desired information from a suitable DB. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, DB manager, compiler, execution engine, and/or other like components. In some implementations, each of the illustrated DBs may generate query plans to access the requested data from that DB, for example, the system DB 24 can generate query plans to access the requested data from the system DB 24. The term "query plan" generally refers to one or more operations used to access information in a DB system. Additionally, the query engine(s) 103 may control or enforce the order in which queries and/or transactions are processed.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL DB engines (e.g., DynamoDB® provided by Amazon.com®, MongoDB query framework provided by MongoDB Inc.®, Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® DB systems, etc.), relational DB (or "NewSQL") engines (e.g., InnoDB™ or MySQL Cluster™ developed by Oracle®, MyRocks™ developed by Facebook.com®, FaunaDB provided by Fauna Inc.), PostgreSQL DB engines (e.g., MicroKernel DB Engine and Relational DB Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional DB engines, extensible query execution engines, package query language (PaQL) execution engines, LegoBase query execution engines, and/or some other query engine used to query some other type of DB system (such as any processing engine or execution technology discussed herein). In some implementations, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store.

Each DB can generally be viewed as a collection of objects, such as a set of logical tables, containing data fitted into predefined or customizable categories. As used herein, a "database object", "data object", or the like may refer to any representation of information in a DB that is in the form of an object or tuple, and may include variables, data structures, functions, methods, classes, DB records, DB fields, DB entities, associations between data and DB entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM DB can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM DB applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant DB system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Each application server 100 is also communicably coupled with a backend cloud system including one or more cloud compute nodes $150_{1-Y}$ (where Y is a number; and collectively referred to as "cloud nodes 150," "cloud system 150," "cloud node 150", or the like), which may also interact with the DBs 22 and 24. The cloud system 150 provides various cloud computing services to CP 50 and/or user systems 12 such as providing IaaS, PaaS, etc., for CPs 50 to operate their distributed applications and services. In various embodiments, the cloud computing services may include the CRAFT services discussed herein. For example, one or more CPs 50 may use the CRAFT services to generate operators and the like according to the embodiments disused with respect to FIGS. 2-4.

The cloud compute nodes 150 may comprise one or more pools of servers, associated data storage devices, and/or other like computer devices dedicated to running/executing order management/processing and/or scheduling/queueing processes, procedures, etc. These servers may include the same or similar processor systems, memory systems, network interface, and other like components as the app servers 100 or other computer systems discussed herein. In some implementations, the servers may be or act as virtualization infrastructure for the cloud system 150. The virtualization infrastructure may comprise various hardware and software components and/or resources that are used to execute virtual or reconfigurable implementations of the cloud system 150, as well as individual components and/or subsystems. The cloud computing services provided by the cloud system 150 may be provided/implemented using virtualization and/or user-level isolation. Virtualization may refer to the abstraction of one or more isolated VMs, which are virtual versions of computer hardware platforms, storage devices, and/or network resource(s) that are operated by a virtual machine monitor (VMM) and/or hypervisor on shared computing resources. Each VM may operate one or more applications to perform various functions and/or provide various services to individual tenants and/or users. User-level isolation (also known as "containerization" or "operating system virtualization") may refer to the abstraction of multiple isolated tenant or user-space instances that may operate their own applications or services, run on a single host, and access a same OS kernel. Each tenant or user-space instance are virtualized and software-defined environments in which software applications can run in isolation of other software running on a physical host machine. The isolated user-space instances may be implemented using any suitable OS-level virtualization technology such as Docker® containers, Kubernetes® containers, Solaris® containers and/or zones, OpenVZ® virtual private servers, DragonFly BSD® virtual kernels and/or jails, chroot jails, sandboxes, and/or the like.

II. Craft Architecture Embodiments

Figure 2:
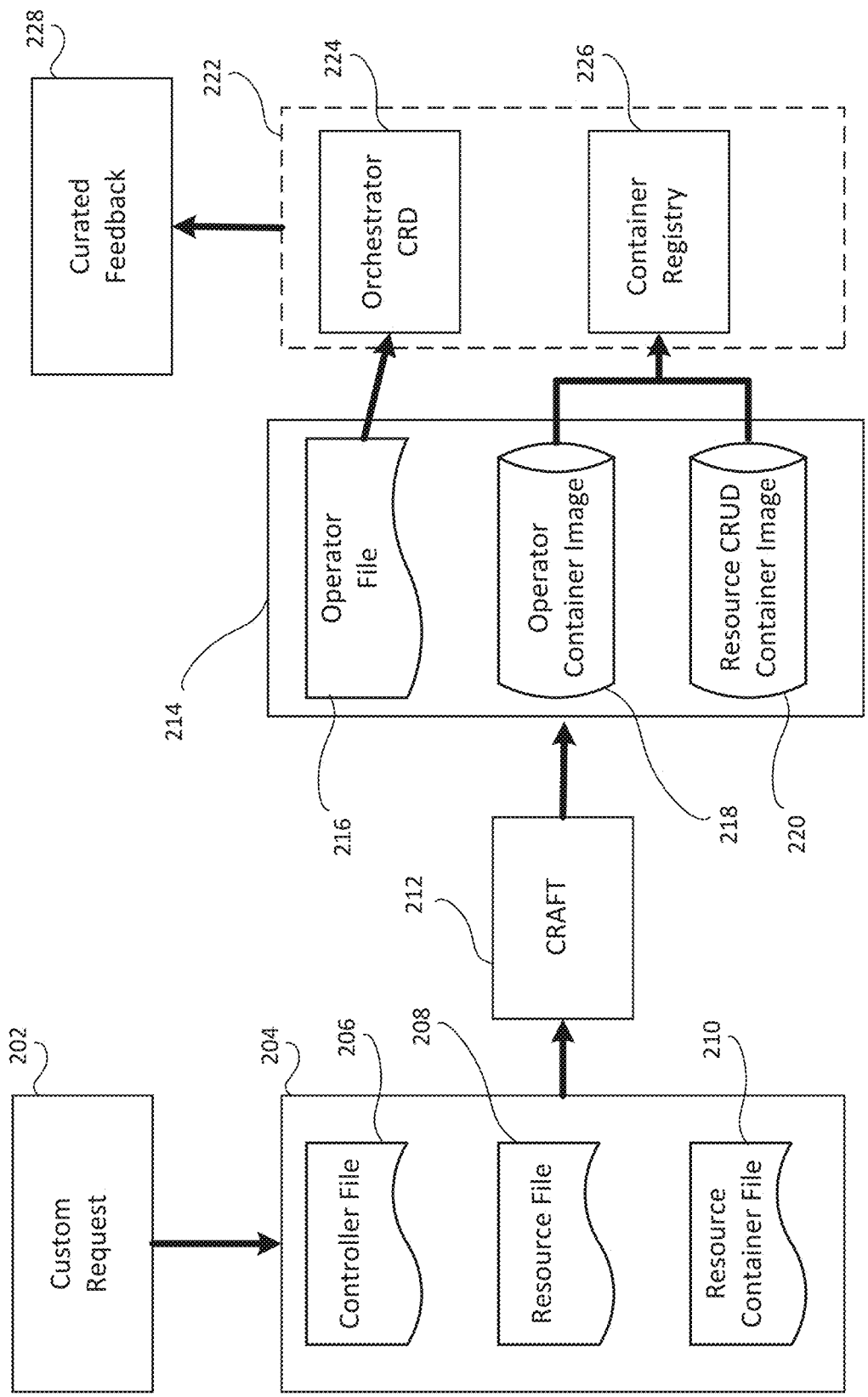
FIG. 2 shows a block context diagram that shows how CRAFT is used to automatically create an operator that can be used to deploy an application, in accordance with various embodiments.

FIG. 2 shows a context diagram that shows how a Custom Resource Abstraction and Fabrication Tool (CRAFT) is used to automatically create an operator that can be used to deploy an application, in accordance with embodiments. As discussed above, CRAFT may be used to declare custom resource operators (e.g., Kubernetes operators) in a high level, generic way for any resource. A "resource" may refer to an object with a type, associated data, a set of methods that operate on it, and relationships to other resources (if applicable). For purposes of the present disclosure, a "resource" may additionally or alternatively include a component that makes up a part of an application or application service. For example, in a customer relationship management (CRM) application, resources may include an email server, database server, and an analytics server, or components thereof. These resources may be customized to include business logic and operational processes, for example, to be included in the deployed application or service.

In some embodiments, CRAFT may be implemented using Kubernetes, and be used to create a Kubernetes Operator for the resources that are used within the deployed application. However, it should be understood that CRAFT may be implemented using some other suitable container orchestration system. As used herein, the term "container" refers to an operating system (OS)-level virtualization instance, and/or refers to a lightweight and portable executable image that contains software and all of its dependencies. In addition or alternative to the above, in Kubernetes-based implementations a "resource" may refer to an endpoint in the Kubernetes API that stores a collection of API objects of a certain kind. A "custom resource" is an extension of the Kubernetes API that represents a customization of a particular Kubernetes installation. Once a custom resource is installed, users can create and access its objects using the kubectl command line interface in a same or similar manner as non-custom (built-in) resources.

An example of a built-in resource is a pod. A pod is the basic execution unit of a Kubernetes application, and is the smallest and simplest unit in the Kubernetes object model that can be created and deployed. A pod represents a unit of deployment, which is a single instance of an application in Kubernetes. A pod may include a single container or a small number of containers that are tightly coupled and that share resources. Additionally or alternatively, a pod represents one or more processes running on a cluster. A "cluster" refers to a set of worker machines or nodes (e.g., one or more physical and/or virtual machines) that run containerized applications. Each cluster has at least one worker node. A pod encapsulates an application's container (or multiple containers), storage resources, a unique network identity (e.g., IP address or the like), as well as options that govern how the container(s) should run. Although Docker® containers are used in this example, pods support other container runtimes as well, such as Kubernetes Container Runtime Interface (CRI), CRI-O, Containerd, and the like. The CRI is an API for container runtimes to integrate with a kubelet on a node. A kubelet is an agent that runs on each node in a cluster, which ensure that containers are running in a pod.

Where Kubernetes is used, the Kubernetes Operator, after application deployment, can be used to automatically manage custom resources across deployment environments. CRAFT may also automate reconciliation for a Kubernetes (custom) resource in order to create native abstractions. In addition, while creating a Kubernetes Operator, CRAFT is able to handle to Kubernetes structural schema validations for a custom resource definition (CRD). A CRD is custom code that defines a resource to add to an API server (e.g., a Kubernetes API server) without building a complete custom server. In Kubernetes implementations, the API server is a front-end component of the Kubernetes control plane that exposes the Kubernetes API. The API server may be implemented or operated by an app server 100 discussed previously. Also, with CRAFT, create, read, update, and delete (CRUD) operations may be performed on the resources using any language.

An "operator" refers to a software extension(s) to a container orchestration service (e.g., Kubernetes®) that make use of custom resources to manage applications and their components. Operators are Representational State Transfer (REST) API extensions used to automate domain-specific workflow actions through declarative manifests. Like traditional REST APIs, an operator has a resource definition and code that knows how to perform CRUD operations on that resource. In Kubernetes nomenclature, the resource definition is called a "Custom Resource" and the code that performs CRUD operations is called Custom Controller. In Kubernetes, controllers extend a cluster's behavior without modifying the code of Kubernetes itself.

Operators are clients of the Kubernetes API that act as controllers for a Custom Resource. In Kubernetes-based implementations, operators offer a Kubernetes-native way to implement platform automation by extending Kubernetes for platform workflows. This allows Operator developers to easily share this automation with a broader community enabling composability and reuse. Ultimately this approach makes it possible to reduce in-house custom platform automation and at the same time offers a declarative way to define the platform workflows using Kubernetes YAMLs. To further reduce the burden on developer teams, embodiments may provide further abstractions that can be expanded or built upon. CRAFT 212 makes it easy to customize/integrate those abstractions as foundation layers, to build new custom abstractions on top of one or more foundational abstractions.

In FIG. 2, a Custom Request 202 may be identified that includes requirements that may reflect business logic, operational requirements, business rules such as defining authorizations for access or for other resources based upon a type of a user for custom resource components that make up the deployed application/service. Based upon the Custom request 202, one or more custom resource components 204 are identified. In this example, custom resource components 204 may include a controller file 206, a resource file 208, and a resource container file 210.

The controller file 206 may be written in a suitable markup language such as XML, JSON (e.g., as shown by Table 1a infra), YAML, and/or some other markup and/or serialization language. The controller file 206 may include CRD information such as group, domain, operator image, and reconciliation frequency. The resource file 208 may be written in XML, JSON (e.g., as shown by Table 2 infra) YAML, and/or some other markup and/or serialization language. The resource file 208 may include schema information for validating inputs while creating a CRD. The resource container file 210 is then built that holds all service dependency files such as packages, data files, and other application-specific files. The resource container file 210 may also contain logic for managing the CRUD resources. In one example, the resource container file 210 may be a Docker® container file or the like.

CRAFT 212 may then be implemented to take as input the controller 206, resource 208, and resource container file 210, and create a deployment set of files 214. These files include the Operator file 216, Operator container image 218, and resource CRUD container image 220. As examples, the Operator file 216 may be generated in XML, JSON, YAML, and/or some other suitable format. In another example, the Operator container image 218 and resource CRUD container image 220 may be an Operator Docker® image 218 and a resource CRUD Docker® image 220, respectively. In embodiments, CRAFT 212 may be run via a command line to create an operator. In one example, using Kubernetes and Docker®, CRAFT 212 may be run via kubectl, which is a command line tool for communicating with an API server such as a Kubernetes API server. In this example, the command line to create a Kubernetes operator is as follows:

"craft create -c<path-to-controller.json>-r<path-to-resource.json>--podDockerFile <path-to-DockerFile>-p"

In embodiments, CRAFT 212 uses the controller file 206 and resource file 208 to develop the operator template and the operator metadata that are both stored in Operator file 216 to build the operator Container image 218 and Resource CRUD Container Image 220. The operator template holds information about the controllers, reconcilers, and configurations such as web hooks, Role-Based Access Control (RBAC) for clusters, and the like. The operator template also stores the application package, such as a "main, go" file in Golang. The operator template also stores operator variables such as, for example, reconciliation frequency, resource manager, CRUD operations deployment, and the like.

The operator metadata stored in the Operator file 216 also holds all the metadata about the operator, like the schema validations, the specification properties, the API version rules, and the like. The Operator file 216 is the backbone of the resource operator. When CRAFT 212 generates the Operator file 216 automatically, it makes the life of the developer easier by generating the required code to deploy the operator to the cluster and to change various application/service requirements, for example, the reconciliation frequency as required.

In an example, a Kubernetes Operator may be deployed to a cluster using the kubectl command line tool. The Kubernetes Operator may be deployed to a cluster by creating a namespace in the cluster by initiating a kubectl command, for example:

kubectl apply -f<path-to-namespace.yaml>

The Kubernetes Operator may be installed in the cluster by initiating another kubectl command, for example:

kubectl apply -f<path-to-operator.yaml>

A container deployment 222 (or simply "container 222" or "deployment 222") may include an orchestrator CRD 224 that is generated from the Operator file 216. In an example, the orchestrator CRD 224 may be a Kubernetes CRD or the like. The deployment 222 also includes a container registry 226 that may be generated from the Operator container image 218 and the Resource CRUD Container Image 220. In an example, the container registry 226 may be Docker® registry 226 or the like.

During and after deployment, the deployment 222 may provide detailed feedback to a Curated feedback module 228. In embodiments, CRAFT 212 (or the curated feedback module 228) may provide additional detailed feedback/information using any suitable mechanism, such as hooks and the like. This detailed feedback may include, for example, raw feedback that may include log files, compile time feedback, and run-time feedback for developers to monitor workflow and identify errors during application deployment.

The curated feedback module 228 may analyze and abstract the raw feedback at a high level to provide dashboard-level information to the developer. This dashboard-level information may include instructions on how the controller file 206 or the resource file 208 can be modified to repair and/or optimize the deployment 222, and then redeploying the application.

With reference to FIG. 2, an example procedure for creating an operator using CRAFT 212 is as follows:

First, the Custom Resource 204 is identified. For developing a CRD, configurations that are unique to the CRD are needed. In this example, the configurations include the controller file 206 (e.g., controller.json) and the resource file 208 (e.g., resource.json). The controller file 206 contains information about the CRD such as group, domain, operator image, reconciliation frequency, and/or other suitable parameters. The resource file 208 is the schema file for validating the input while creating the CRD. Once the input for both the files is filled, the custom resource 204 image may be built.

Second, the custom container image (e.g., Custom Docker® Image) is built. The custom container image is a file that holds all of the service dependency files such as packages, data files, and other app specific files. Along with this, the container file 210 also contains the logic for managing the CRUD resources. In the example of FIG. 2, the custom container image may be the resource container file 210. A CRUD container entry point (e.g., a Docker entry point) receives a resource object as a parameter, and based on the operation, it will return a specific exit code, which may be one of a plurality of exit codes (e.g., one of the 14 exit codes shown by Table 5). With the information files and container image, CRAFT 212 can create and deploy the operator onto a cluster.

Third, the operator template is created using CRAFT 212. CRAFT 212 uses the controller file 206 (e.g., controller.json) and the resource file 208 (e.g., resource.json) to develop the operator template and the operator metadata to build the operator images (e.g., images 218 and/or 220) and deploy the operator on the cluster. In embodiments, the operator template and the operator metadata are stored in the operator file 216 (e.g., operator.yaml). The operator template can be created using CRAFT with one of the following commands.

craft create -c<path-to-controller.json>-r<path-to-resource.json>
    craft create -c<path-to-controller.json>-r<path-to-resource.json>--podDockerFile <path-to-DockerFile>-p Either of these commands will create an operator template in a source path (e.g., GOPATH/src or $GOPATH/src/<operator-name>). The operator template is a data structure that includes all the necessary files for running and deploying the operator, such as controllers, reconcilers, configurations (e.g., RBAC, webhooks, etc.), and an application package (e.g., main.go and/or the like in Golang).

Fourth, the operator file 216 is generated. The operator file 216 (e.g., operator.yaml) contains all the metadata that is required to install the operator on the cluster. The operator file 216 may include information such as specifications, dependencies, and the like. As an example, the following command may be run to generate the operator file 216:

craft build deploy -a<path-to-controller.json>-r<path-to-resource.json>

Fifth, a container image is built and pushed. A controller container image (e.g., a controller DockerImage) contains all the necessary information that is required to create the operator image 218 and push it to the container 222 (e.g., a Docker® container or the like). All of the user's CRUD operations are place in the controller container image. In the example of FIG. 2, this controller container image may be the resource CRUD container image 220. To generate the operator image 218, the following command may be run:

craft build image -b -a<path-to-controller.json>--podDockerFile <path-to-DockerFile>

The following command may be used to push the operator image 218 and controller image 220 onto the container 222:

docker push <operator-image> and docker push <controller-image>

The following command can be used to validate the operator prior to deployment:

craft validate -p<operator.yaml-path>

Sixth, deploy the operator to a cluster. After completing the setup (e.g., the previously described first through fifth steps), the operator can be deployed to the cluster. First, a namespace is created in the cluster using the following command:

kubectl apply -f<path-to-namespace.yaml>

The created namespace can be checked by running kubectl get ns and see if the namespace in the generated list. Next, the operator is installed in the cluster using the following command:

kubectl apply -f<path-to-operator.yaml>

This step installs all the configurations and resources needed to run the operator, and applications can now be run on the cluster.

As alluded to previously, a developer provides the configurations and validations needed to develop the CRD in the form of the controller file 206 (e.g., controller.json) and resource file 208 (e.g., resource.json). These configurations and validations are then used by CRAFT 212 to develop an operator template and operator metadata in the form of the operator file 218 (e.g., operator.yaml), build operator container image 218, and deploy the operator 220 onto a cluster. CRAFT 212 generates the operator-template including information about the controllers, reconcilers, configurations (e.g., web hooks, RBAC, etc.), and the application package (e.g., main.go in Golang). This operator template controls the operator variables that need to be controlled, such as reconciliation frequency, resource manager, CRUD operations deployment, and the like. The operator file 218 generated by CRAFT contains all the metadata about the operator such as, for example, schema validations, specification properties, the API version rules, and the like. The operator file 218 helps in creating the operator and deploying it into the cluster. The operator file 218 code is generated by CRAFT and includes the code used to deploy the operator to the cluster and make changes to the operator variables (e.g., reconciliation frequency, etc.) when required. Furthermore, by generating logs and providing compile-time and runtime feedback (e.g., at the curated feedback module 228), CRAFT 212 also provides for easy monitoring of the workflow and easy identification of errors, if any, in the application deployment.

Table 1a shows an example of controller code used by CRAFT to create a custom resource operator that can be used to deploy an application, in accordance with various embodiments. The sample controller code shown in Table 1a corresponds to the controller file 206 of FIG. 2. The examples shown in Table 1a, Table 2, Table 3, and Table 4 deal with the creation and deployment of a Wordpress Kubernetes operator and are not meant to limit the embodiments to this particular use case.

TABLE 1a example controller.json

{
    "group": "wordpress",
    "resource": "WordpressAPI",
    "repo": "wordpress",
    "domain": "salesforce.com",
    "namespace": "default",
    "version": "v1",
    "operator_image": "ops0-artifactrepo1-0-prd.data.sfdc.net/cco/wordpress-operator",
    "image": "ops0-artifactrepo1-0-prd.data.sfdc.net/cco/wordpress:latest", TABLE 1a-continued example controller.json

```
    "imagePullSecrets": "registrycredential",
    "imagePullPolicy": "IfNotPresent",
    "cpu_limit": "500m",
    "memory_limit": "200Mi",
    "vault_addr": "http://10.215.194.253:8200"
}
```

In Table 1a, example of controller code used by CRAFT to create a custom resource operator that can be used to deploy an application, in accordance with various embodiments. The various elements in the controller file 206 are defined, including a resource "WordpressAPI" associated with a group "wordpress" that will be run within the domain "salesforce.com." It also includes the location of the operator image ("ops0-artifactrepo1-0-prd.data.sfdc.net/cco/wordpress-operator"), as well as a vault address of where the secrets are to be pulled ("registrycredential") for application security during operation.

Table 1b shows another example of controller code used by CRAFT according to various embodiments. In Table 1b, various elements in the controller file 206 are defined, including a resource "CloneautobuildAPI associated with a group "abclone" that will be run within the domain "salesforce.com." It also includes the location of an operator image (e.g., "ops0-artifactrepo1-0-prd.data.sfdc.net/cco/abclone-operator:1.0"), as well as a vault address of where secrets are to be pulled for application security during operation (e.g., "registrycredentials"). This example also contains features such as "reconcileFreq," which is used to control the frequency of reconciliation and "runOnce," which can be set to zero to stop reconciliation.

TABLE 1b example controller.json

```
{
    "group": "abclone",
    "resource": "CloneautobuildAPI",
    "repo": "abclone",
    "namespace": "craft",
    "image": "ops0-artifactrepo1-0-prd.data.sfdc.net/cco/abclone:1.0",
    "operator_image": "ops0-artifactrepo1-0-prd.data.sfdc.net/cco/abclone-operator:1.0",
    "imagePullPolicy": "IfNotPresent",
    "imagePullSecrets": "registrycredentials",
    "domain": "salesforce.com",
    "version": "v1",
    "cpu_limit": "500m",
    "memory_limit": "200Mi",
    "reconcileFreq": "360",
    "runOnce": "1",
    "vault_addr": "http://10.215.194.253:8200"
}
```

Table 2 shows example resource code used by CRAFT to create a custom resource operator that can be used to deploy an application, in accordance with embodiments. The resource code shown in Table 2 corresponds to the resource file 208 of FIG. 2. With respect to FIG. 2, the expected format for various elements are defined in the resource file 208. For example, in Table 2, bootstrap password, title, URL, and user data elements all have defined pattern and a string type attributes. Similarly, database password ("db_password") and volume mounts ("dbVolumeMount") have defined pattern and string type attributes. With respect to Wordpress, it also has a defined pattern and string type for its volume mount (see e.g., "wordpressVolumeMount" in Table 2). The "required" data element is used to define which of the other data elements are required for the resources to be accessed. In this example, each of the elements are defined as "required" for the resources to be accessed.

TABLE 2 example resource.json

```
{
    "type": "object",
    "properties": {
        "bootstrap_email": {
            "pattern": "^(.*)$",
            "type": "string"
        },
        "bootstrap_password": {
            "pattern": "^(.*)$",
            "type": "string"
        },
        "bootstrap_title": {
            "pattern": "^(.*)$",
            "type": "string"
        },
        "bootstrap_url": {
```
```
            "pattern": "^(.*)$",
            "type": "string"
        },
        "bootstrap_user": {
            "pattern": "^(.*)$",
            "type": "string"
        },
        "db_password": {
            "pattern": "^(.*)$",
```

TABLE 2-continued example resource.json

```
            "name": {
                "pattern": "^(.*)$",
                "type": "string"
            },
            "replicas": {
                "format": "int64",
                "type": "integer",
                "minimum": 1,
                "maximum": 5
            },
            "user": {
                "pattern": "^(.*)$",
                "type": "string"
            },
            "wordpressVolumeMount": {
                "pattern": "^(.*)$",
                "type": "string"
            }
        },
        "required": [
            "bootstrap_email",
            "bootstrap_password",
            "bootstrap_title",
            "bootstrap_url",
            "bootstrap_user",
```

TABLE 2-continued example resource.json

```
        "type": "string"
    },
    "dbVolumeMount": {
        "pattern": "^(.*)$",
        "type": "string"
    },
    "host": {
        "pattern": "^(.*)$",
        "type": "string"
    },
```

```
            "db_password",
            "dbVolumeMount",
            "host",
            "instance",
            "name",
            "replicas",
            "user",
            "wordpressVolumeMount"
        ]
    }
```

TABLE 2-continued example resource.json

```
    "instance": {
        "enum": [
            "prod",
            "dev"
        ],
        "type": "string"
    },
```

Table 3 shows an example of a Create command implementation in CRAFT to create a custom resource operator that can be used to deploy an application, in accordance with embodiments.

TABLE 3 example Create command implementation in CRAFT

```
package cmd
import (
    "fmt"
    "io/ioutil"
    "os"
    pathLib "path"
    "path/filepath"
    "strings"
    "text/template"
    "git.soma.salesforce.com/core-eng-ops/craft/utils"
    log "github.com/sirupsen/logrus"
    "github.com/spf13/cobra"
    "github.com/spf13/viper"
)
var (
    resourceFile string
)
func renderTemplate(operatorPath string) {
    resourceDef := fmt.Sprintf("api/%s/%s_types.go",
        apiFileObj.Version,
        strings.ToLower(apiFileObj.Resource))
    dirs := [ ]string{"controllers", "reconciler", "main.go", "Dockerfile",
"v1/resource"
    for _, dir := range dirs {
        path := pathLib.Join(baseOperator, dir)
        err := filepath.Walk(path, func(path string, info os.FileInfo, err error) error
            if utils.FileExists(path) {
                tpl, err := template.ParseFiles(path)
                if err != nil {
                    log.Fatal(err)
                }
                newPath := strings.Replace(path, baseOperator, operatorPath, 1)
                if strings.HasSuffix(path, "v1/resource.go") {
                    newPath = pathLib.Join(operatorPath, resourceDef)
                }
                log.Debugf("Rendering file: %s", newPath)
                fi, err := os.Create(newPath)
                if err != nil {
                    log.Fatal(err)
                }
                err = tpl.Execute(fi, apiFileObj)
                if err != nil {
                    log.Fatal(err)
                }
            }
            return nil
        })
        if err != nil {
            log.Fatal(err)
        }
    }
}
func cpFile(operatorPath string) {
    dirs := [ ]string{"controllers", "reconciler"}
    for _, dir := range dirs {
        pth := pathLib.Join(operatorPath, dir)
        os.MkdirAll(pth, os.ModePerm)
    }
}
```

TABLE 3-continued example Create command implementation in CRAFT

```
func cpAPIFile(apiFile string, operatorPath string) {
    input, err := ioutil.ReadFile(apiFile)
    if err != nil {
        fmt.Println(err)
return
}
    dstFile := filepath.Join(operatorPath, "api.json")
    err = ioutil.WriteFile(dstFile, input, 0644)
    if err != nil {
        fmt.Println("Error creating", dstFile)
        fmt.Println(err)
        return
    }
}
func absApiPath( ) {
    var err error
    apiFile, err = filepath.Abs(apiFile)
    if err != nil {
        log.Fatal(err)
    }
    log.Debug("apiFile: ", apiFile)
}
func absResourcePath( ) {
    var err error
    resourceFile, err = filepath.Abs(resourceFile)
    if err != nil {
        log.Fatal(err)
    }
    log.Debug("resourceFile: ", resourceFile)
}
func absPath( ) {
    absApiPath( )
    absResourcePath( )
}
func createCmd( ) *cobra.Command {
    cmd := &cobra.Command{
        Use: "create",
        Aliases: [ ]string{"c"},
        Short: "create operator in $GOPATH/src",
        Long: "create operator in $GOPATH/src",
        Run: func(cmd *cobra.Command, args [ ]string) {
            absPath( )
            apiFileObj.loadApi(apiFile)
            apiFileObj.LowerRes = strings.ToLower(apiFileObj.Resource)
            var kubeCmdString string
            newOperatorPath := pathLib.Join(goSrc, apiFileObj.Repo)
            os.RemoveAll(newOperatorPath)
            os.MkdirAll(newOperatorPath, os.ModePerm)
            kubeCmdString = fmt.Sprintf("kubebuilder init --domain %s --repo %s", apiF
            utils.CmdExec(kubeCmdString, newOperatorPath)
            kubeCmdString = fmt.Sprintf("kubebuilder create api --group %s --version %
                apiFileObj.Group,
                apiFileObj.Version,
                apiFileObj.Resource,
            )
            utils.CmdExec(kubeCmdString, newOperatorPath)
            utils.CmdExec("rm -rf controllers", newOperatorPath)
            cpFile(newOperatorPath)
            cpAPIFile(apiFile, newOperatorPath)
            kubeCmdString = fmt.Sprintf("rm -rf api/%s/%s_types.go",
                apiFileObj.Version,
                apiFileObj.LowerRes)
            utils.CmdExec(kubeCmdString, newOperatorPath)
            kubeCmdString = fmt.Sprintf("schema-generate -p %s -o api/%s/spec_type.go
                apiFileObj.Version,
                apiFileObj.Version,
                resourceFile)
            utils.CmdExec(kubeCmdString, newOperatorPath)
            renderTemplate(newOperatorPath)
            utils.CmdExec("make generate", newOperatorPath)
        },
    }
    cmd.PersistentFlags( ).StringVarP(&apiFile, "apiFile", "a", "api file with
grou
    cmd.PersistentFlags( ).StringVarP(&resourceFile, "resourceFile", "r", "",
"resource
    cmd.MarkPersistentFlagRequired("apiFile")
    cmd.MarkPersistentFlagRequired("resourceFile")
```

TABLE 3-continued example Create command implementation in CRAFT

```
    // cmd.MarkPersistentFlagRequired("environ")
    if err := viper.BindPFlag("apiFile", cmd.Flags( ).Lookup("apiFile")); err != nil {
        log.Fatal(err)
    }
    if err := viper.BindPFlag("resourceFile", cmd.Flags( ).Lookup("resourceFile")); err
        log.Fatal(err)
    }
    return cmd
}
```

Table 4 shows an example of automatically generated custom resource operator code that can be used to deploy an application, in accordance with embodiments. In the example of Table 4, the control plane is a container orchestration layer that exposes the API and interfaces to define, deploy, and manage the lifecycle of containers.

TABLE 4 example Operator.yaml

```
apiVersion: v1
kind: Namespace
metadata:
    creationTimestamp: null
    labels:
        control-plane: controller-manager
    name: craft
spec: { }
status: { }
---
apiVersion: apiextensions.k8s.io/v1beta1
kind: CustomResourceDefinition
metadata:
    annotations:
        controller-gen.kubebuilder.io/version: v0.2.5
    creationTimestamp: null
    name: wordpressapis.wordpress.salesforce.com
spec:
    group: wordpress.salesforce.com
    names:
        kind: WordpressAPI
        listKind: WordpressAPIList
        plural: wordpressapis
        singular: wordpressapi
    scope: Namespaced
    validation:
        openAPIV3Schema:
            description: WordpressAPI is the Schema for the WordpressAPIs API
            properties:
                apiVersion:
                    description: 'APIVersion defines the versioned schema of this
                        representation of an object. Servers should convert recognized schemas
                        to the latest internal value,and may reject unrecognized values. More info:
                        https://git
                    type: string
                kind:
                    description: 'Kind is a string value representing the REST resource this
                        object represents. Servers may infer this from the endpoint the client
                        submits reguests to. Cannot be updated. In CamelCase. More info:
                        https://git
                    type: string
                metadata:
                    type: object
                spec:
                    properties:
                        bootstrap_email:
                            pattern: ^(.*)$
                            type: string
                        bootstrap_password:
                            pattern: ^(.*)$
                            type: string
                        bootstrap_title:
                            pattern: ^(.*)$
                            type: string
```

TABLE 4-continued example Operator.yaml

```
            bootstrap_url:
                pattern: ^(.*)$
                type: string
            bootstrap_user:
                pattern: ^(.*)$
                type: string
            db_password:
                pattern: ^(.*)$
                type: string
            dbVolumeMount:
                pattern: ^(.*)$
                type: string
            host:
                pattern: ^(.*)$
                type: string
            instance:
                enum:
                - prod
                - dev
                type: string
            name:
                pattern: ^(.*)$
                type: string
            replicas:
                format: int64
                maximum: 5
                minimum: 1
                type: integer
            user:
                pattern: ^(.*)$
                type: string
            wordpressVolumeMount:
                pattern: ^(.*)$
                type: string
            required:
            - bootstrap_email
            - bootstrap_password
            - bootstrap_title
            - bootstrap_url
            - bootstrap_user
            - db_password
            - dbVolumeMount
            - host
            - instance
            - name
            - replicas
            - user
            - wordpressVolumeMount
            type: object
        status:
            description: WordpressAPIStatus defines the observed state of WordpressAPI
            properties:
                message:
                    type: string
                pod:
                    properties:
                        name:
                            type: string
                        namespace:
                            type: string
                        type:
                            type: string
                    type: object
                state:
                    type: string
                statusPayload:
                    description: 'INSERT ADDITIONAL STATUS FIELD - define observed state
                        of cluster   Important: Run "make" to regenerate code after modifying
                        this file'
                    type: string
                terminated:
                    description: ContainerStateTerminated is a terminated state of a container
                    properties:
                        containerID:
                            description: Container's ID in the format 'docker://<container_id>'
                            type: string
                        exitCode:
                            description: Exit status from the last termination of the container
```

TABLE 4-continued example Operator.yaml

```
                            format: int32
                            type: integer
                        finishedAt:
                            description: Time at which the container last terminated
                            format: date-time
                            type: string
                        message:
                            description: Message regarding the last termination of the container
                            type: string
                        reason:
                            description: (brief) reason from the last termination of the contain
                            type: string
                        signal:
                            description: Signal from the last termination of the container
                            format: int32
                            type: integer
                        startedAt:
                            description: Time at which previous execution of the container start
                            format: date-time
                            type: string
                    required:
                    - exitCode
                    type: object
                type: object
            type: object
        version: v1
        versions:
        - name: v1
            served: true
            storage: true
    status:
        acceptedNames:
            kind: ""
            plural: ""
        conditions: [ ]
        storedVersions: [ ]
---
apiVersion: rbac.authorization.k8s.io/v1
kind: Role
metadata:
    creationTimestamp: null
    name: word press-leader-election-role
    namespace: craft
rules:
- apiGroups:
    - ""
    resources:
    - configmaps
    verbs:
    - get
    - list
    - watch
    - create
    - update
    - patch
    - delete
- apiGroups:
    - ""
    resources:
    - configmaps/status
    verbs:
    - get
    - update
    - patch
    - apiGroups:
        - ""
    resources:
    - events
    verbs:
    - create
---
apiVersion: rbac.authorization.k8s.io/v1
kind: ClusterRole
metadata:
    creationTimestamp: null
    name: wordpress-manager-role
```

TABLE 4-continued example Operator.yaml

```
rules:
- apiGroups:
    - wordpress.salesforce.com
   resources:
    - wordpressapis
   verbs:
    - create
    - delete
    - get
    - list
    - patch
    - update
    - watch
- apiGroups:
    - wordpress.salesforce.com
   resources:
    - wordpressapis/status
   verbs:
    - get
    - patch
    - update
---
apiVersion: rbac.authorization.k8s.io/v1
kind: ClusterRole
metadata:
    creationTimestamp: null
    name: wordpress-proxy-role
rules:
- apiGroups:
    - authentication.k8s.io
   resources:
    - tokenreviews
   verbs:
    - create
    - apiGroups:
    - authorization.k8s.io
   resources:
    - subjectaccessreviews
   verbs:
    - create
---
apiVersion: rbac.authorization.k8s.io/v1beta1
kind: ClusterRole
metadata:
    creationTimestamp: null
    name: wordpress-metrics-reader
rules:
- nonResourceURLs:
    - /metrics
   verbs:
    - get
---
apiVersion: rbac.authorization.k8s.io/v1
kind: RoleBinding
metadata:
    creationTimestamp: null
    name: word press-leader-election-rolebinding
    namespace: craft
roleRef:
    apiGroup: rbac.authorization.k8s.io
    kind: Role
    name: word press-leader-election-role
subjects:
- kind: ServiceAccount
    name: default
    namespace: craft
---
apiVersion: rbac.authorization.k8s.io/v1
kind: ClusterRoleBinding
metadata:
    creationTimestamp: null
    name: word press-manager-rolebinding
roleRef:
    apiGroup: rbac.authorization.k8s.io
    kind: ClusterRole
    name: wordpress-manager-role
```

TABLE 4-continued example Operator.yaml

```
subjects:
- kind: ServiceAccount
    name: default
    namespace: craft
---
apiVersion: rbac.authorization.k8s.io/v1
kind: ClusterRoleBinding
metadata:
    creationTimestamp: null
    name: word press-proxy-rolebinding
roleRef:
    apiGroup: rbac.authorization.k8s.io
    kind: ClusterRole
    name: wordpress-proxy-role
subjects:
- kind: ServiceAccount
    name: default
    namespace: craft
---
apiVersion: v1
kind: Service
metadata:
    creationTimestamp: null
    labels:
        control-plane: controller-manager
    name: word press-controller-manager-metrics-service
    namespace: craft
spec:
    ports:
    - name: https
        port: 8443
        targetPort: https
    selector:
        control-plane: controller-manager
status:
    loadBalancer: { }
---
apiVersion: apps/v1
kind: Deployment
metadata:
    creationTimestamp: null
    labels:
        control-plane: controller-manager
    name: wordpress-controller-manager
    namespace: craft
spec:
    replicas: 1
    selector:
        matchLabels:
            control-plane: controller-manager
    strategy: { }
    template:
        metadata:
            creationTimestamp: null
            labels:
                control-plane: controller-manager
        spec:
            containers:
            - args:
                - --secure-listen-address=0.0.0.0:8443
                - --upstream = http://127.0.0.1:8080/
                - --logtostderr=true
                - --v=10
                image: gcr.io/kubebuilder/kube-rbac-proxy:v0.5.0
                name: kube-rbac-proxy
                ports:
                - containerPort: 8443
                    name: https
                resources: { }
            - args:
                - --metrics-addr=127.0.0.1:8080
                - --enable-leader-election
                command:
                - /manager
                image: ops0-artifactrepo1-0-prd.data.sfdc.net/cco/wordpress-operator:latest
                name: manager
```

TABLE 4-continued example Operator.yaml

```
        resources:
            limits:
                cpu: 100m
                memory: 30Mi
            requests:
                cpu: 100m
                memory: 20Mi
        imagePullSecrets:
        - name: registrycredential
        terminationGrace Period Seconds: 10
status: { }
```

Figure 3:
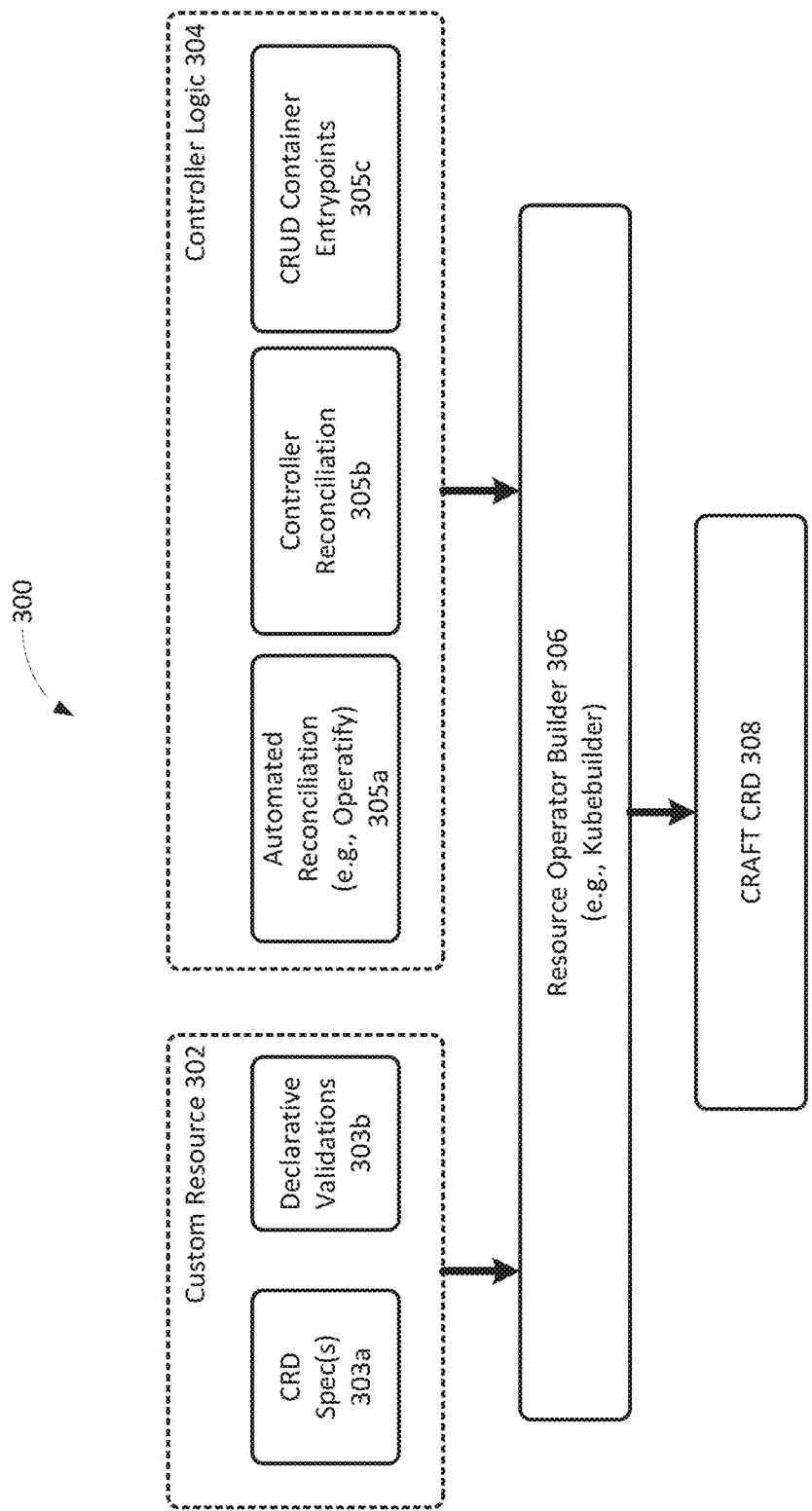
FIG. 3 shows an example of various components that interact with CRAFT and their relationship with Open Source components, in accordance with various embodiments.
Figure 4:
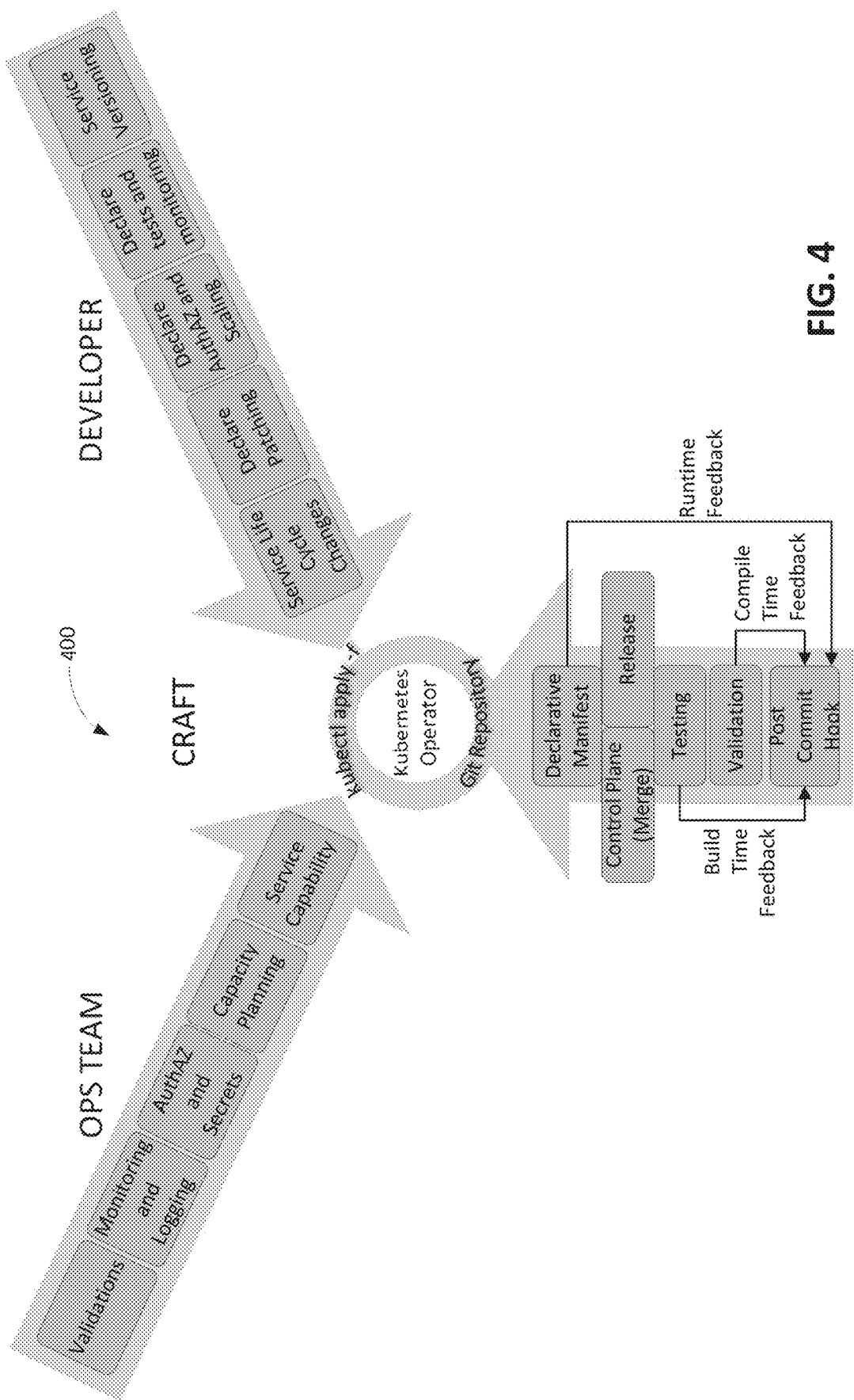
FIG. 4 shows an example CRAFT service lifecycle according to various embodiments.

FIG. 3 shows an example CRAFT implementation 300 including various CRAFT components, in accordance with various embodiments. FIG. 3 describes various components that may be similar to components shown and described with respect to FIG. 2. In one example, the CRAFT components in FIG. 3 may interact with CRAFT and with Open Source components.

In FIG. 3, custom resource 302 may be similar to resource file 208, and include elements information related to declarative validations, and custom resource definition specifications, including elements required to be included within the deployed application. Controller logic 304 may be similar to controller file 206 of FIG. 2. In one example implementation, and the controller logic 304 may include Automated Reconciliation, controlled reconciliation, and CRUD Container Entrypoints. In one example implementation, the CRUD Container Entrypoints may be CRUD Docker Entrypoints. Additionally or alternatively, automated reconciliation and controlled reconciliation are declared in file 206 of FIG. 2, and the CRUD Container Entrypoints are declared in file 210 of FIG. 2.

The components of custom resource 302 and controller logic 304 are used by the resource operator builder 306 to create a CRAFT CRD 308, which may be similar to the operator file 216 of FIG. 2. In an example implementation, open-source initiatives such as Kubebuilder and Operatify can be used to assist CRAFT. In this example implementation, the resource operator builder 306 may be implemented using Kubebuilder and the Automated Reconciliation 305a is implemented using Operatify. Kubebuilder 306 is a framework for building Kubernetes APIs using CRDs. In this example implementation, Kubebuilder 306 is used to create a controller interface, API, and configuration files as follows:
    kubebuilder init --domain <domain-name>--owner <owner-name>--repo <repository>
    kubebuilder create api --group <group-name>--controller -resource Kubebuilder 308 builds a basic skeleton of the controllers (e.g., controller logic 304), and generates an API and configuration files. In Kubernetes, controllers are control loops that monitor the state of a cluster, and make or request changes where needed. Each controller tries to move a current cluster state closer to a desired state. A controller tracks at least one resource type. These objects have a spec field that represents the desired state. The controller(s) for that resource are responsible for making the current state come closer to that desired state. The controller may carry out some or all actions out itself and/or will send messages to the API server to perform various actions. The specifications of the operator that were declared in the controller file 206 (e.g., controller.json) and the resource file 208 (e.g., resource.json) are then provided as input(s) to Kubebuilder 308.

Kubebuilder 308 commands also need input(s) in the form of individual flags. These inputs are usually not provided in a consolidated fashion. In this example, CRAFT takes in the controller file 206 (e.g., controller.json) and the resource file 208 (e.g., resource.json) and feeds the specifications to Kubebuilder 308 as input in the form of flags. This may be done in a CRAFT create function (see e.g., Table 3).

Once the controller skeleton is generated, the reconciliation logic 305a and 305b can then be implemented. Operatify 305a is used for this purpose because this functionality is not offered by the Kubebuilder 308. Operatify 305a provides an approach to automate reconciliation. CRAFT 300 also uses an approach to automate any custom resource, using pod status exit codes (see e.g., Table 5). All of the user's CRUD operations are put in a container image (e.g., DockerImage), which receives resource object as a parameter and returns an exit code (e.g., one of the 14 exit codes shown by Table 5) based on the performed operation.

In some implementations, CRAFT 300 offers a solution to integration problems using the kubeplus addon. Application workflows on Kubernetes are realized by establishing connections between Kubernetes Resources (APIs). These connections can be based on various relationships such as labels, annotations, ownership, and the like. In Kubernetes application workflows are built by establishing relationships between Kubernetes built-in and/or custom resources. (e.g., a service is connected to a pod through labels). The kubeplus addon simplifies building, visualizing, and monitoring these application workflows. The kubeplus addon provides various annotations on CRDs to encode the relationships that can be established with a custom resource and what actions will be performed as a result of them. This helps CRAFT 300 to discover the capabilities of the various custom resources in the cluster and define binding(s) between the various resources.

In addition, CRAFT 300 has a feedback (compile-time feedback and runtime feedback) mechanism (see e.g., curated feedback module 228 in FIG. 2), which helps in maintaining track of the workflow in the cluster. CRAFT 300 also offers structural schema validation for a CRD 308, which happens while creating the operator using CRAFT itself. This will helps create a native kubernetes abstraction declaratively, without any underlying abstractions. With all these pieces in place, all the entities (personnel) who engage with a service can manage the service through its service lifecycle declaratively as shown by example service lifecycle 400 of FIG. 4.

Figure 5:
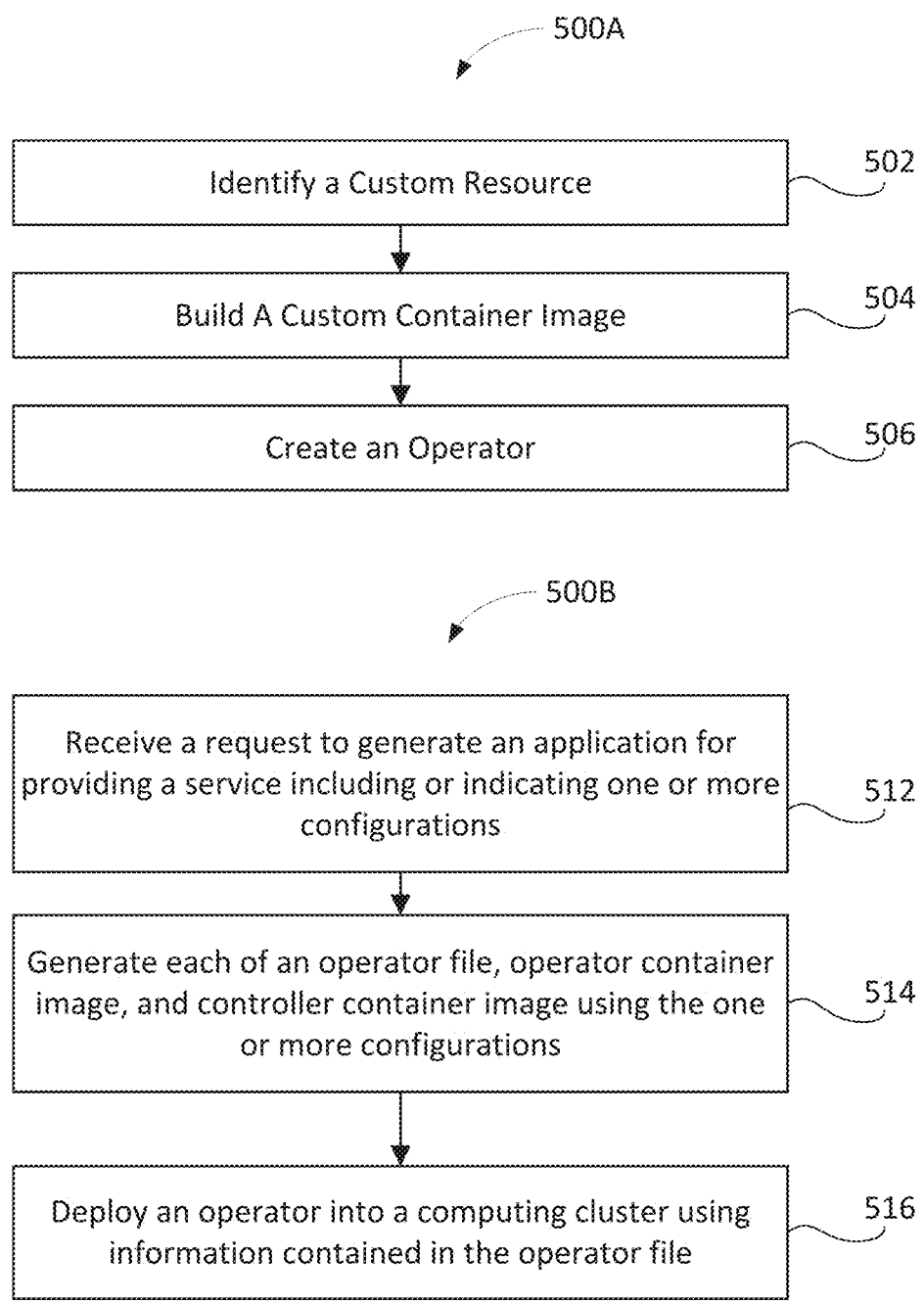
FIG. 5 shows example processes for automatically creating a custom resource operator, in accordance with various embodiments.

FIG. 5 shows an example processes 500A and 500B for automatically creating a custom resource operator, in accordance with various embodiments. Processes 500A and 500B may be implemented by one or more of the components or functions discussed previously with respect to FIG. 2, and/or may be performed by one of the elements discussed previously such as app server 100 or the like.

Process 500A begins at operation 502 where an app server 100 identifies a custom resource. In embodiments, a custom resource may be a component that makes up a final deployed application in a container environment or other like user-isolation environment, for example Wordpress® in a Kubernetes® environment. In embodiments, the identification of the custom resource includes entries in a controller file 206, which may include CRD information such as group, domain, operator image, and reconciliation frequency. The identification of the custom resource may also include entries in the resource file 208 that may include schema information for validating inputs while creating the CRD. At operation 504, the app server 100 builds a custom container image. In embodiments, the custom container image may include the resource container file 210. The resource container file 210 may include all service dependency files such as packages, data files, and other application-specific files. The resource container file 210 may also contain logic for managing CRUD resources. At operation 506, the app server 100 creates an operator. In embodiments, this includes using CRAFT 212 to create a custom resource operator. In embodiments, CRAFT 212 combines the data in the controller file 206, the resource file 208, and the resource container file 210 to produce the operator file 216. After performance of operation 506, process 500A may end or repeat as necessary.

Process 500B begins at operation 512 where an app server 100 receives a request to generate an application for providing a service. The request includes (e.g., in a request message) or indicates (e.g., includes suitable resources or identifiers) one or more configurations. The one or more configurations indicate application requirements for the application that is to be generated. At operation 514, the app server 100 generates, using the one or more configurations, each of an operator file 216, an operator container image 218, and a controller container image 220. At operation 516, the app server 100 deploys an operator into a computing cluster using information contained in the operator file 216. This may include creating (or building) a container on a computing cluster using the operator container image and the controller container image, and deploying the operator into the container using information contained in the operator file 216. The operator includes code to perform one or more operations according to the application requirements indicated by the one or more configurations. After performance of operation 516, process 500B may end or repeat as necessary.

In some embodiments, the request may be received from a user (developer) via an application programming interface (API), a command file, and/or a declarative manifest. In some embodiments, the API includes a Kubernetes API, the command file includes a kubectl imperative command, and/or the declarative manifest includes a YAML file. In some embodiments, the one or more configurations include a controller file 206 and a resource file 208. The controller file 206 may include a custom resource definition (CRD). The CRD indicates one or more of a group, domain, operator image, and reconciliation frequency. The resource file 208 may include schema information for validating inputs while creating the CRD.

In some embodiments, processes 500A and/or 500B may further include the app server 100 generating the controller container image using the controller file. The controller container image may include service dependency files. In some embodiments, processes 500A and/or 500B may further include the app server 100 generating the operator using the one or more configurations and the controller container image. In some embodiments, the one or more configurations are stored in a version control system or a source code repository. In some embodiments, the application requirements include one or more of a compile time, a build time, and a run time of the service.

In some embodiments, processes 500A and/or 500B further include the app server 100 identifying one or more operational status codes in response to performance of the one or more operations of the operator; and determining one or more actions to improve the performance of the one or more operations based on the identified operational status codes. In some embodiments, the one or more actions are based on a time when respective status codes of the one or more operational status codes are generated. In some embodiments, the app server 100 maps the one or more operational status codes to respective messages. The respective messages include a notification or an instruction of a corresponding action of the one or more actions. In these embodiments, the app server 100 provides the respective messages to a user associated with the service. In some embodiments, the operational status codes include one or more of run time status codes, build time status codes, and compile time status codes. The run time status codes include one or more of errors generated by components, logs generated by components, or state changes of components. The build time status codes include one or more of semantic errors, dependency errors, packaging errors, or pipeline errors. The compile time status codes include one or more of schema errors or input errors.

Table 5 shows an example of exit codes that may be used in conjunction with deployed application feedback that may be used by a curated feedback module 228, in accordance with embodiments. The entries in Table 5 may correspond to exit codes that are generated after an operator is deployed into the cluster and when CRUD operations are performed. In some embodiments, the exit codes may be used in place of, or together with, HTTP status codes in suitable HTTP messages. Additionally or alternatively, one or more of the exit codes, when generated, may be sent to the curated feedback module 228 to be analyzed, processed, and displayed to a developer along with a request for any action to be taken.

TABLE 5 example Exit codes

Exitcode to state mapping
    201: "Succeeded", // create or update
    202: "AwaitingVerification", // create or update
    203: "Error", // create or update
    211: "Ready", // verify
    212: "InProgress", // verify
    213: "Error", // verify
    214: "Missing", // verify
    215: "UpdateRequired", // verify
    216: "RecreateRequired", // verify
    217: "Deleting", // verify
    221: "Succeeded", // delete
    222: "InProgress", // delete
    223: "Error", // delete
    224: "Missing", // delete Table 6 shows a count of lines of code that make the different sections generated using CRAFT according to various embodiments. Table 6 shows lines of code used to implement legacy custom resource operators in contrast to the number of lines of code to implement a custom resource operator with CRAFT 212, in accordance with embodiments. The example of Table 6 is based on creating a Wordpress custom operator, where CRAFT 212 generated 3771 lines of code that otherwise would have to have been written by a software developer. Table 6 shows the classification of these lines of code including reconciler code, controller code, configurations code, API specifications code, and required application package (e.g., GO files such as DockerFile, PROJECT, MakeFile, go.mod, go.sum, and main.go). It should be understood that other programming language files may be generated and deployed in other embodiments.

TABLE 6

| Code Sections | Lines of Code | Commands to Get Lines of Code Count |
|---|---|---|
| Reconciler code | 1689 | cd $GOPATH/src/<operator-name>/reconciler<br>cat * \| wc -l |
| Controller code | 219 | cd $GOPATH/src/<operator-name>/controllers<br>cat * \| wc -l |
| Configurations code | 510 | cd $GOPATH/src/<operator-name>/configfind . -type f -exec wc -l { } \; \| awk '{print $1}' \| paste -sd+ - \| bc |
| API specifications code | 587 | cd $GOPATH/src/<operator-name>/api<br>find . -type f -exec wc -l { } \; \| awk '{print $1}' \|<br>paste -sd+ - \| bc |
| GO files (DockerFile, PROJECT, MakeFile, go.mod, go.sum and main.go) | 766 | cd $GOPATH/src/<operator-name><br>cat * \| wc -l |

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, for example, ORACLE®, DB2® by IBM®, and the like without departing from the scope of the implementations claimed.

It should also be understood that some of the disclosed implementations can be embodied in the form of various types of hardware, software, firmware, middleware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Python, PyTorch, NumPy, Ruby, Ruby on Rails, Scala, Smalltalk, Java™, C++, C#, "C", Rust, Go (or "Golang"), EMCAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), Extensible Markup Language (XML), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), and/or any other programming language or development tools including proprietary programming languages and/or development tools. Furthermore, some or all of the software components or functions described herein can utilize a suitable querying language to query and store information in one or more databases or data structures, such as, for example, Structure Query Language (SQL), object query language (OQL), Salesforce® OQL (SOQL), Salesforce® object search language (SOSL), Salesforce® analytics query language (SAQL), and/or other query languages. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and/or the like, or any combination of such storage or transmission devices.

Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, includes a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable storage media (NTCRSM) comprising instructions, wherein execution of the instructions is operable to cause a computing system to:
receive a request to generate an application for providing a service, wherein the request includes a set of configurations, and the set of configurations include application requirements for the application that is to be generated and a controller file, wherein the controller file includes custom resource definition (CRD), and the CRD indicates one or more of a group, domain, operator image, and reconciliation frequency;
generate, using the set of configurations, each of an operator file, an operator container image, and a controller container image, wherein:
the operator file contains metadata for deployment of an operator on a cluster,
the operator container image includes code used for the deployment of the operator to the cluster and to make changes to a set of operator variables, and
the controller container image includes information used to create the operator container image and a set of service dependency files, wherein the controller container image is generated using the controller file;
create a container on a computing cluster using the operator container image and the controller container image;
generate an operator using the set of configurations and the controller container image, wherein the operator includes code to perform one or more operations according to the application requirements; and
deploy the operator into the container using information contained in the operator file.

2. The one or more NTCRSM of claim 1, wherein the request is received via an application programming interface (API), a command file, or a declarative manifest.

3. The one or more NTCRSM of claim 2, wherein the API includes a Kubernetes API, the command file includes a kubectl imperative command, and the declarative manifest includes a YAML file.

4. The one or more NTCRSM of claim 1, wherein the set of configurations includes a resource file that includes schema information for validating inputs while creating the CRD.

5. The one or more NTCRSM of claim 1, wherein the set of configurations includes a resource container file, and execution of the instructions is further to operable to cause the computing system to:
build a custom container image to include the resource container file, wherein the resource container file includes the set of service dependency files, and the set of service dependency files includes one or more of a set of packages, a set of data files, and a set of application-specific files.

6. The one or more NTCRSM of claim 1, wherein the operator file contains metadata used to install the operator on the cluster.

7. The one or more NTCRSM of claim 1, wherein the controller container image includes information used to create the operator container image.

8. The one or more NTCRSM of claim 1, wherein the set of configurations are stored in a version control system or a source code repository.

9. The one or more NTCRSM of claim 1, wherein the application requirements include one or more of a compile time, a build time, and a run time of the service.

10. The one or more NTCRSM of claim 1, wherein execution of the instructions is further to operable to cause the computing system to:
identify one or more operational status codes in response to performance of the one or more operations of the operator; and
determine one or more actions to improve the performance of the one or more operations based on the identified operational status codes.

11. The one or more NTCRSM of claim 10, wherein the one or more actions are based on a time when respective status codes of the one or more operational status codes are generated.

12. The one or more NTCRSM of claim 10, wherein execution of the instructions is further to operable to cause the computing system to:
map the one or more operational status codes to respective messages, the respective messages including a notification or an instruction of a corresponding action of the one or more actions; and
provide the respective messages to a user associated with the service.

13. The one or more NTCRSM of claim 10, wherein the operational status codes include one or more of run time status codes, build time status codes, and compile time status codes,
the run time status codes include one or more of errors generated by components, logs generated by components, or state changes of components,
the build time status codes include one or more of semantic errors, dependency errors, packaging errors, or pipeline errors, and
the compile time status codes include one or more of schema errors or input errors.

14. A computing system comprising:
a network interface configurable to receive a request to generate an application for providing a service, the request including or indicating a set of configurations, the set of configurations indicating application requirements for the application that is to be generated, and the set of configurations including a controller file, wherein the controller file includes custom resource definition (CRD), wherein the CRD indicates one or more of a group, domain, operator image, and reconciliation frequency; and
a processor system communicatively coupled with the network interface, the processor system configurable to:
generate, using the set of configurations, each of:
an operator file that contains metadata for deployment of an operator on a cluster,
an operator container image that includes code used for the deployment of the operator to the cluster and to make changes to a set of operator variables, and
a controller container image that includes information used to create the operator container image and a set of service dependency files, wherein the controller container image is generated using the controller file;

create a container on a computing cluster using the operator container image and the controller container image; and generate the operator using the operator container image and the controller container image, wherein the operator includes program code to perform one or more operations according to the application requirements; and deploy the operator into the container using information contained in the operator file.

15. The computing system of claim 14, wherein the set of configurations includes a resource file, wherein the resource file includes schema information for validating inputs while creating the CRD.

16. The computing system of claim 15, wherein the processor system is configurable to:

generate the operator using the operator container image, the controller container image, the controller file, and the resource file.

17. The computing system of claim 14, wherein the application requirements include one or more of a compile time, a build time, and a run time of the service.

18. The computing system of claim 14, wherein the processor system is configurable to:

identify one or more operational status codes in response to performance of the one or more operations of the operator;

determine one or more actions to improve the performance of the one or more operations based on the identified operational status codes;

map the one or more operational status codes to respective messages, the respective messages including a notification or an instruction of a corresponding action of the one or more actions; and provide the respective messages to a user associated with the service.

19. The computing system of claim 18, wherein the operational status codes include one or more of:

run time status codes, the run time status codes including one or more of errors generated by components, logs generated by components, or state changes of components;

build time status codes, the build time status codes including one or more of semantic errors, dependency errors, packaging errors, or pipeline errors, and compile time status codes, the compile time status codes including one or more of schema errors or input errors.

* * * * *